US012739807B2

(12) United States Patent
Park et al.

(10) Patent No.: US 12,739,807 B2
(45) Date of Patent: Sep. 15, 2026

(54) METHOD AND DEVICE FOR TRANSMITTING FEEDBACK FRAME IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 698 days.

(21) Appl. No.: 18/250,298

(22) PCT Filed: Oct. 15, 2021

(86) PCT No.: PCT/KR2021/014400

§ 371 (c)(1),
(2) Date: Apr. 24, 2023

(87) PCT Pub. No.: WO2022/097958

PCT Pub. Date: May 12, 2022

(65) Prior Publication Data

US 2023/0397179 A1 Dec. 7, 2023

Related U.S. Application Data

(60) Provisional application No. 63/110,365, filed on Nov. 6, 2020.

(30) Foreign Application Priority Data

Nov. 9, 2020 (KR) ........................ 10-2020-0148749
Sep. 6, 2021 (KR) ........................ 10-2021-0118525

(51) Int. Cl.
*H04W 72/0453* (2023.01)
*H04W 84/12* (2009.01)

(52) U.S. Cl.
CPC ........ *H04W 72/0453* (2013.01); *H04W 84/12* (2013.01)

(58) Field of Classification Search
None
See application file for complete search history.

(56) References Cited

U.S. PATENT DOCUMENTS

2018/0359761 A1* 12/2018 Chun .................... H04W 72/21
2021/0266207 A1* 8/2021 Cariou .................. H04L 1/1685
(Continued)

FOREIGN PATENT DOCUMENTS

KR 10-2013-0079550 7/2013
KR 10-2014-0109374 9/2014
(Continued)

OTHER PUBLICATIONS

Cao et al. (doc.:IEEE 802.11-20/1747r2, EHT NDPA Partial BW Info Design, dated Oct. 30, 2020, all pages) (Year: 2020).*
(Continued)

*Primary Examiner* — Srinivasa R Reddivalam
(74) *Attorney, Agent, or Firm* — LEE, HONG, DEGERMAN, KANG & WAIMEY

(57) ABSTRACT

Proposed are a method and device for transmitting a feedback frame in a wireless LAN system. Specifically, a reception STA receives an NDPA frame from a transmission STA through a 320 MHz band. The reception STA receives an NDP frame from the transmission STA. The reception STA transmits a feedback frame to the transmission STA on the basis of the NDP frame. The NDPA frame includes information about a portion of the band. The information about the portion of the band includes a bitmap composed of the first to ninth bits.

13 Claims, 24 Drawing Sheets

(56) References Cited

U.S. PATENT DOCUMENTS

2021/0336752 A1* 10/2021 Kwon .................. H04L 5/0055
2021/0409249 A1* 12/2021 Chen .................... H04L 1/0026

FOREIGN PATENT DOCUMENTS

WO 2020-050680 3/2020
WO WO-2020050680 A1 * 3/2020 ............ H04W 72/12

OTHER PUBLICATIONS

PCT International Application No. PCT/KR2021/014400, International Search Report dated Jan. 17, 2022, 3 pages.
Liu et al., "EHT NDPA Frame Design Discussion," IEEE 802.11-20/1015r1, Jul. 2020, 24 pages.
Chen et al., "EHT Punctured NDP and Partial BW Feedback Tones," IEEE 802.11-20/1161r0, Aug. 2020, 17 pages.

* cited by examiner

FIG. 1
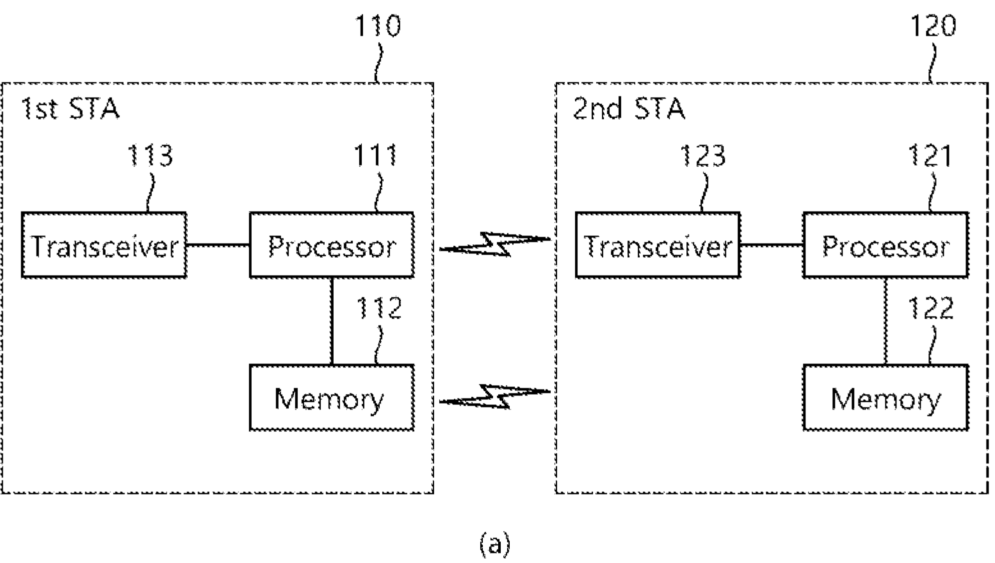
(a)
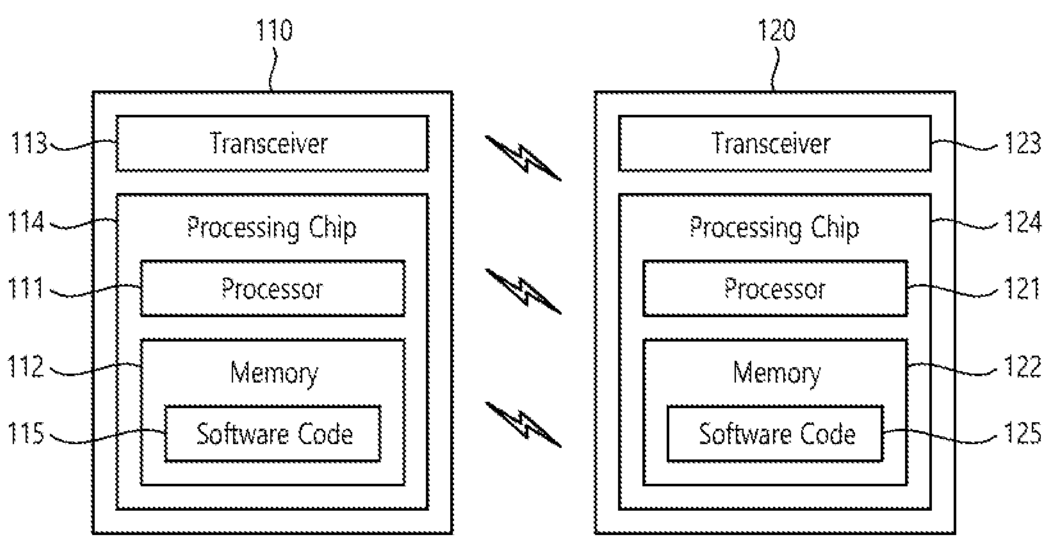
(b)

FIG. 2
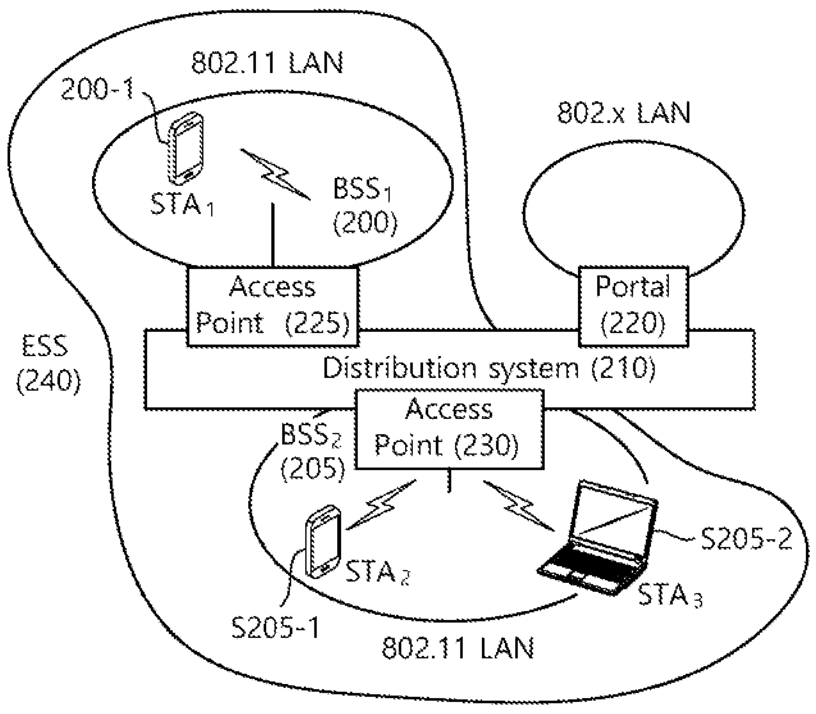
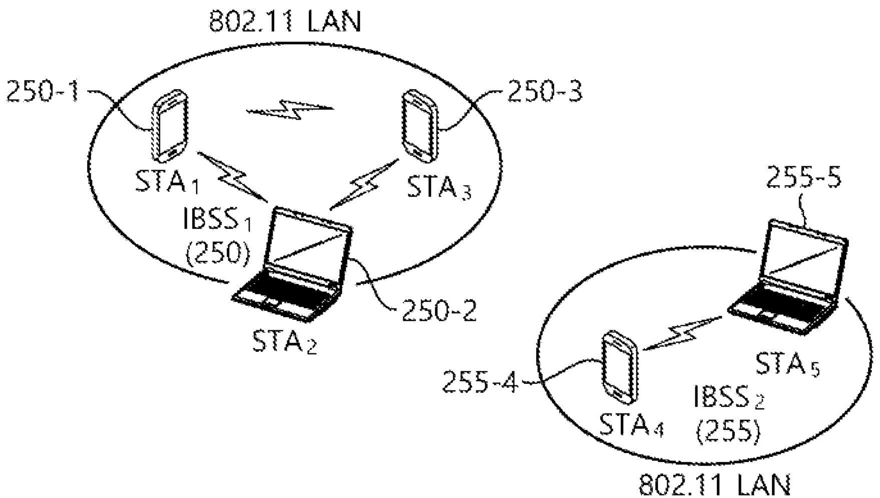

FIG. 4

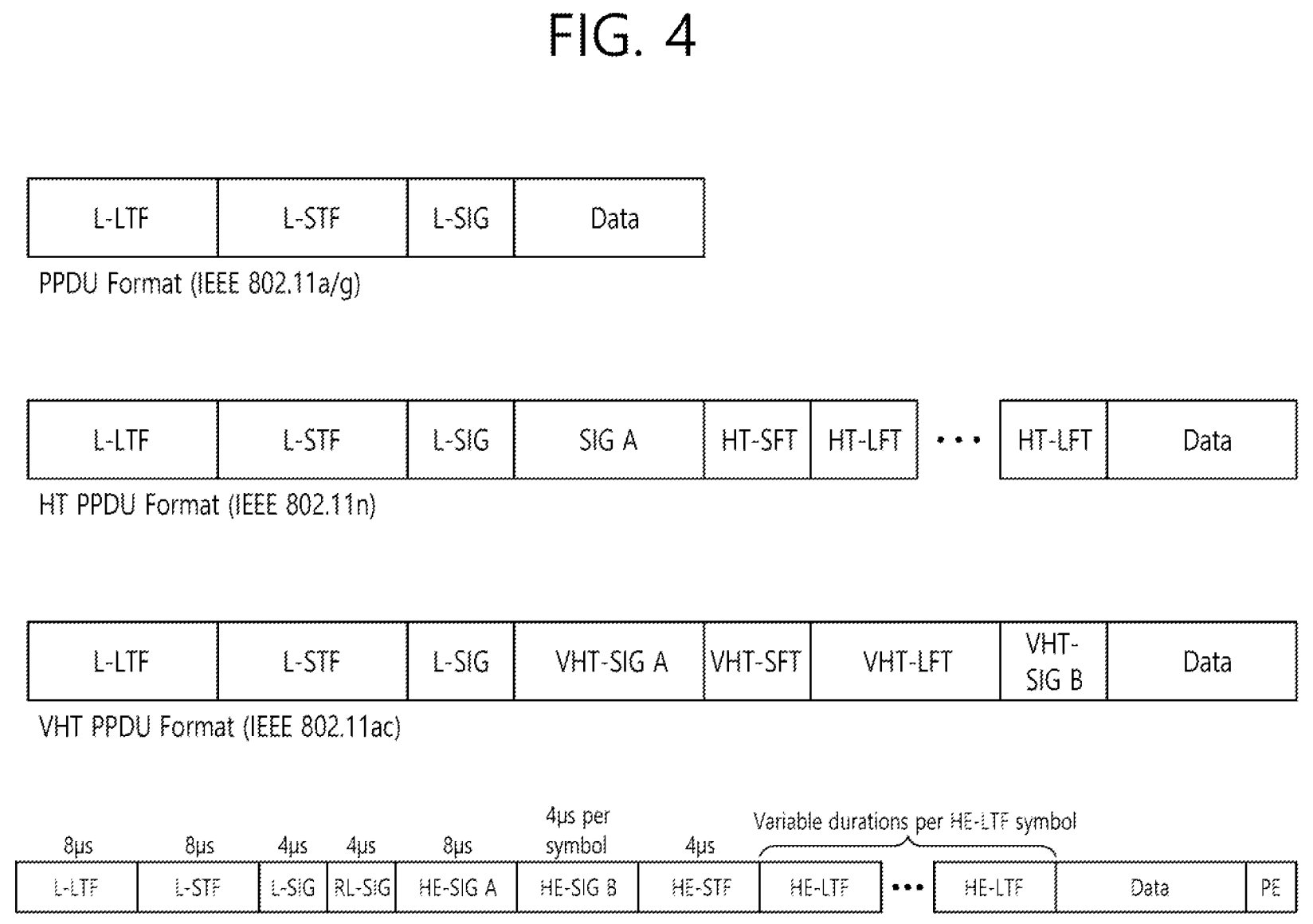

L-LTF | L-STF | L-SIG | Data

PPDU Format (IEEE 802.11a/g)

L-LTF | L-STF | L-SIG | SIG A | HT-SFT | HT-LFT | ... | HT-LFT | Data

HT PPDU Format (IEEE 802.11n)

L-LTF | L-STF | L-SIG | VHT-SIG A | VHT-SFT | VHT-LFT | VHT-SIG B | Data

VHT PPDU Format (IEEE 802.11ac)

8μs | 8μs | 4μs | 4μs | 8μs | 4μs per symbol | 4μs

L-LTF | L-STF | L-SIG | RL-SIG | HE-SIG A | HE-SIG B | HE-STF | HE-LTF | ... | HE-LTF | Data | PE Variable durations per HE-LTF symbol

FIG. 10

| L-STF | L-LTF | L-SIG | RL-SIG | U-SIG | EHT-SIG | EHT-STF | EHT-LTF | Data |
|---|---|---|---|---|---|---|---|---|

MAC header
Frame Control
Duration
RA
TA
Sounding Dialog Token
STA Info 1
• • •
STA Info n
FCS
Octets:
2
2
6
6
1
4
4
4
B0
B10
B11
B19
B20
B21
B24
B25
B26
B27
B28
B29
B31
AID 11
Partial BW Info
Reserved
Nc Index
Feedback Type And Ng
Disambiguation
Codebook Size
Reserved
Bits:
11
9
1
4
2
1
1
3
B0
B1
B8
Resolution
Feedback bitmap
Bits:
1
8

FIG. 15

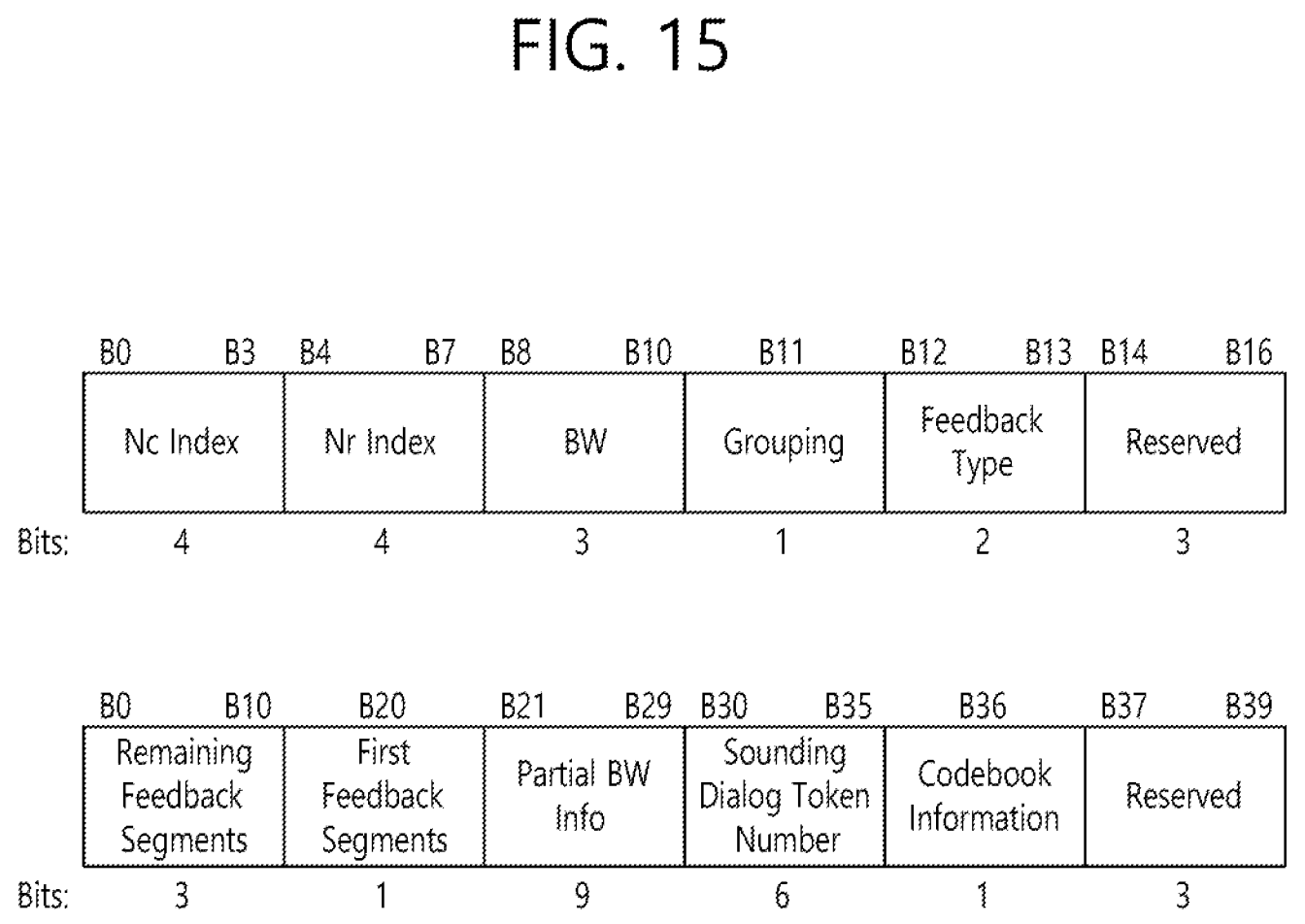

| | B0 B3 | B4 B7 | B8 B10 | B11 | B12 B13 | B14 B16 |
|---|---|---|---|---|---|---|
| | Nc Index | Nr Index | BW | Grouping | Feedback Type | Reserved |
| Bits: | 4 | 4 | 3 | 1 | 2 | 3 |

| | B0 B10 | B20 | B21 B29 | B30 B35 | B36 | B37 B39 |
|---|---|---|---|---|---|---|
| | Remaining Feedback Segments | First Feedback Segments | Partial BW Info | Sounding Dialog Token Number | Codebook Information | Reserved |
| Bits: | 3 | 1 | 9 | 6 | 1 | 3 |

FIG. 20

<table>
<tr><th>Partial BW feedback bitmap</th><th colspan="8">Feedback RU/MRU</th></tr>
<tr><td>0 0100 0000</td><td></td><td>242</td><td></td><td></td><td></td><td></td><td></td><td></td></tr>
<tr><td>1 0100 0000</td><td></td><td>484</td><td></td><td></td><td></td><td></td><td></td><td></td></tr>
<tr><td>0 1111 0000</td><td colspan="4">996</td><td colspan="4"></td></tr>
<tr><td>1 1111 0000</td><td colspan="4">996*2</td><td colspan="4"></td></tr>
<tr><td>0 1111 1101</td><td colspan="4">996</td><td colspan="2">484</td><td></td><td>242</td></tr>
<tr><td>1 1111 1101</td><td colspan="4">996*2</td><td colspan="2">996</td><td></td><td>484</td></tr>
<tr><td>0 1100 1111</td><td colspan="2">484</td><td colspan="2"></td><td colspan="4">996</td></tr>
<tr><td>1 1100 1111</td><td colspan="2">996</td><td colspan="2"></td><td colspan="4">996*2</td></tr>
</table>

METHOD AND DEVICE FOR TRANSMITTING FEEDBACK FRAME IN WIRELESS LAN SYSTEM

CROSS-REFERENCE TO RELATED APPLICATION(S)

This application is the National Stage filing under 35 U.S.C. 371 of International Application No. PCT/KR2021/014400, filed on Oct. 15, 2021, which claims the benefit of U.S. Provisional Application No. 63/110,365, filed on Nov. 6, 2020, and also claims the benefit of earlier filing date and right of priority to Korean Application Nos. 10-2020-0148749, filed on Nov. 9, 2020, and 10-2021-0118525, filed on Sep. 6, 2021, the contents of which are all hereby incorporated by reference herein in their entireties.

TECHNICAL FIELD

The present specification relates to a technique for transmitting a feedback frame in a WLAN system, and more particularly, to a method and apparatus for configuring a bitmap included in an NDPA frame for requesting feedback for partial bands.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for transmitting a feedback frame in a wireless LAN system.

An example of the present specification proposes a method for transmitting a feedback frame.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment is performed in a receiving STA, and the transmitting STA may correspond to a beamformee or at least one STA (station). A transmitting STA may correspond to a beamformer or an access point (AP).

This embodiment proposes a method of configuring an information field for partial bands of an NDPA frame for channel sounding feedback in puncturing in a 320 MHz band or various RUs/MRUs.

A transmitting station (STA) transmits a Null Data Packet Announcement (NDPA) frame to the receiving STA through a 320 MHz band.

The transmitting STA transmits an NDP frame to the receiving STA.

The transmitting STA receives a feedback frame based on the NDPA frame and the NDP frame from the receiving STA.

The NDPA frame includes information on a partial band. The information on the partial band includes a bitmap composed of first to ninth bits.

The first bit is a bit requesting feedback information for a specific 80 MHz channel of the 320 MHz band.

The second bit is a bit requesting feedback information for an 80 MHz channel having the lowest frequency in the 320 MHz band. The third bit is a bit requesting feedback information for an 80 MHz channel having a second lowest frequency in the 320 MHz band. The fourth bit is a bit requesting feedback information for an 80 MHz channel having the second highest frequency in the 320 MHz band. The fifth bit is a bit requesting feedback information for an 80 MHz channel having the highest frequency in the 320 MHz band.

The sixth to ninth bits are bits requesting feedback information on 242-tone resource unit (RU) or a 484-tone RU in the specific 80 MHz channel.

The feedback frame may include feedback information for the requested channel based on the bitmap. The feedback information may include channel state information for an RU or a multi resource unit (MRU) for which feedback is requested based on the bitmap.

According to the embodiment proposed in this specification, by configuring information (bitmap) on a partial band included in an NDPA frame, it is possible to perform a feedback request in puncturing or various RUs/MRU. Accordingly, there is an effect of reducing the feedback overhead and improving the overall performance of the sounding procedure between the beamformer and the beamformer.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 10 illustrates an example of a PPDU used in the present specification.

FIG. 15 shows an example of an EHT MIMO Control field format.

FIG. 20 shows an RU/MRU that can request partial BW feedback through a Partial BW Info field.

DETAILED DESCRIPTION

Figure 3:
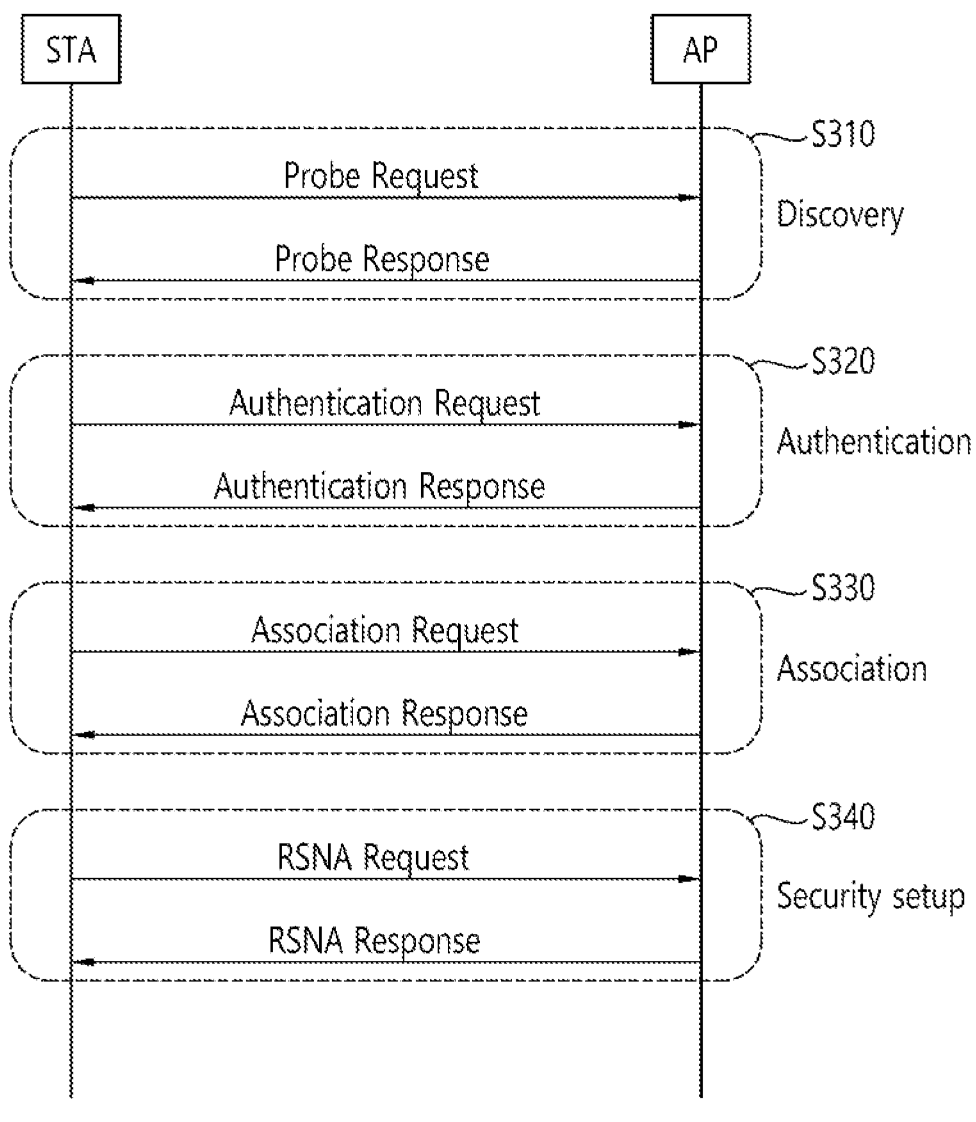
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (S SID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
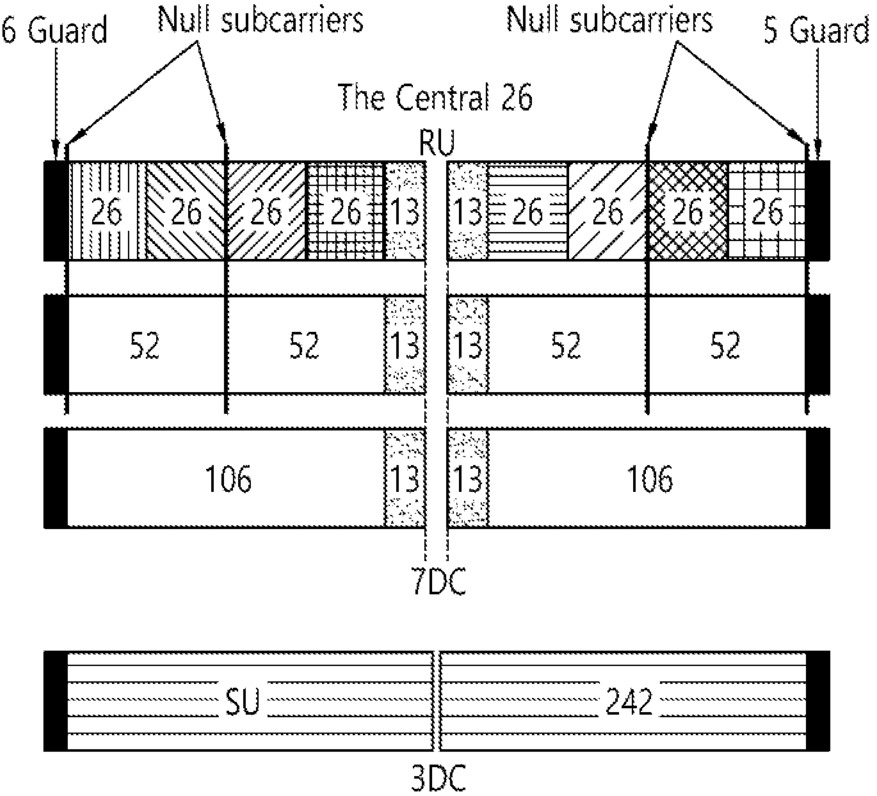
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
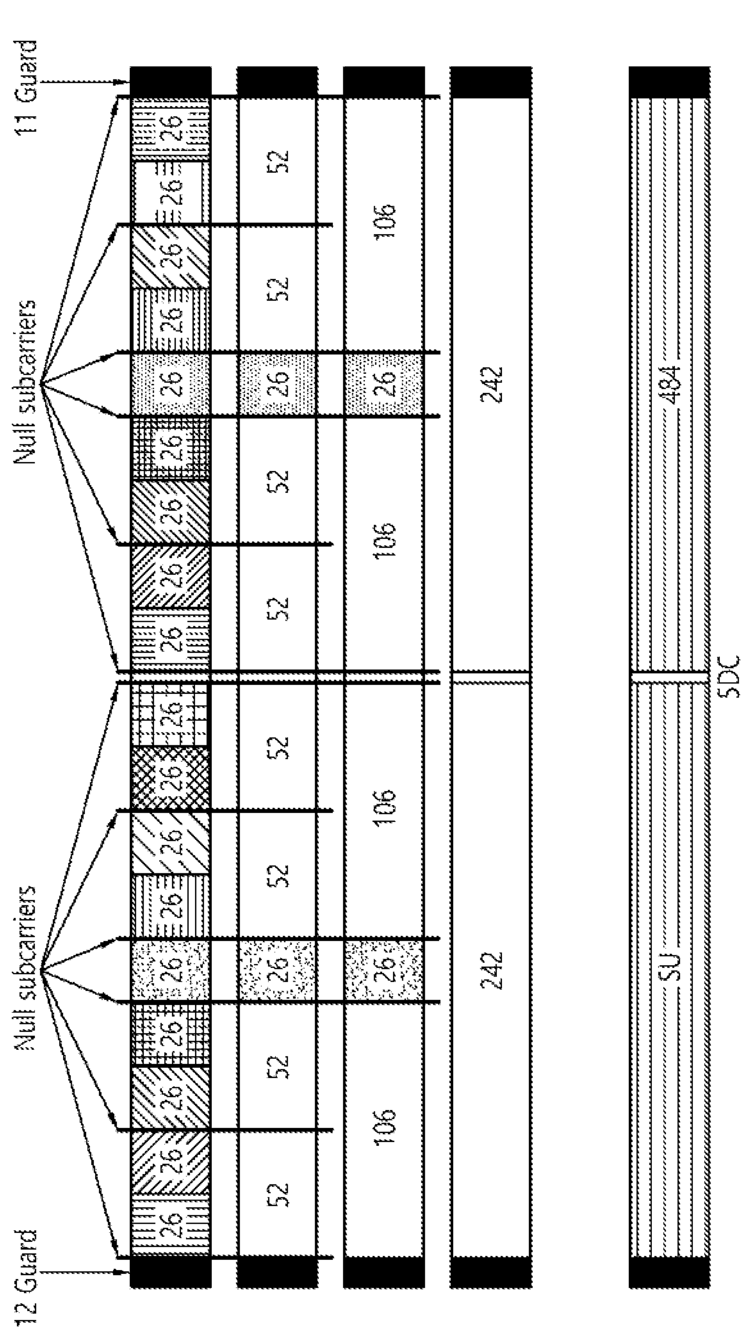
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
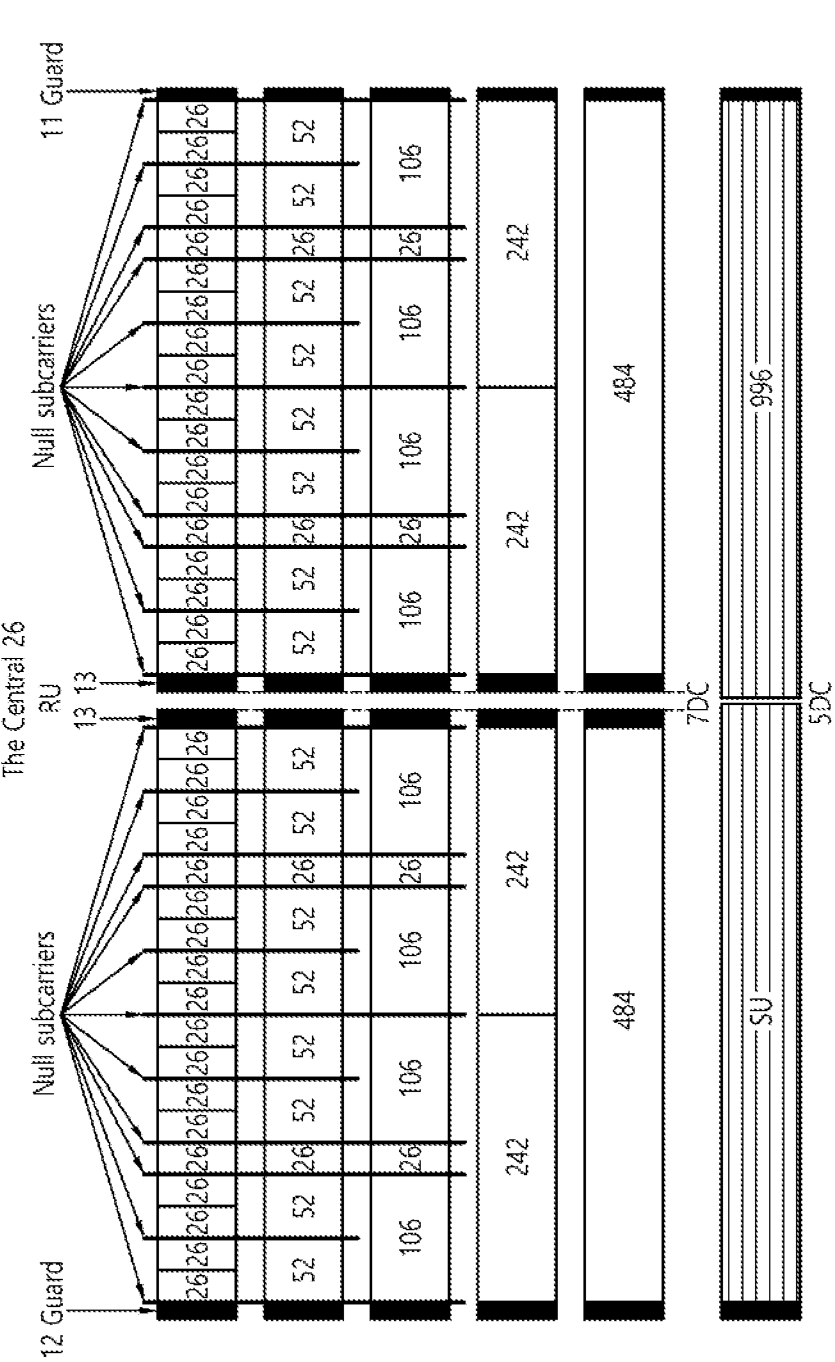
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
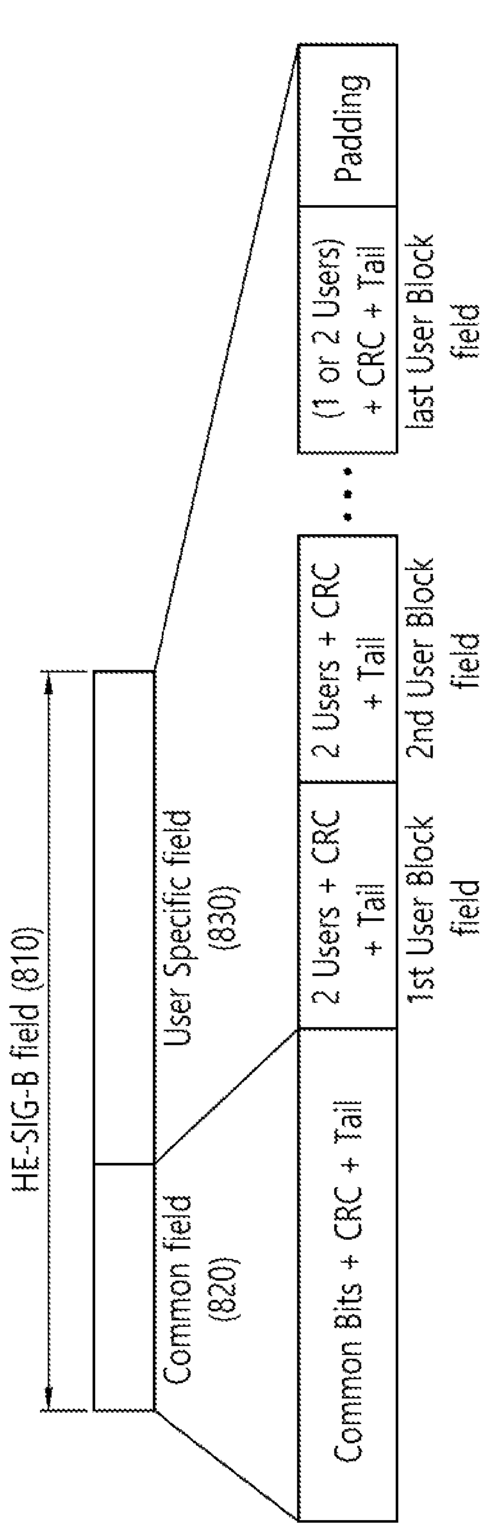
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | 106 | | | | 26 | 26 | 26 | 26 | 26 | 8 |
| $01001y_2y_1y_0$ | 106 | | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
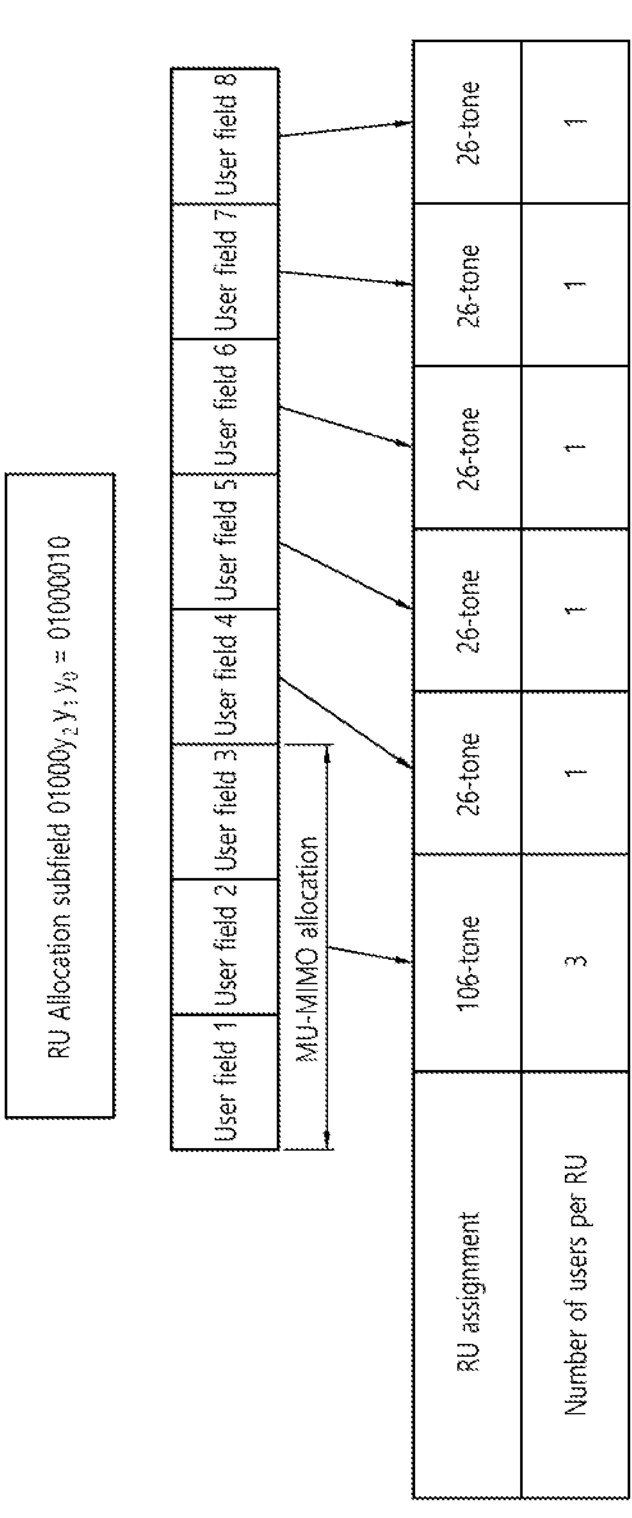
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
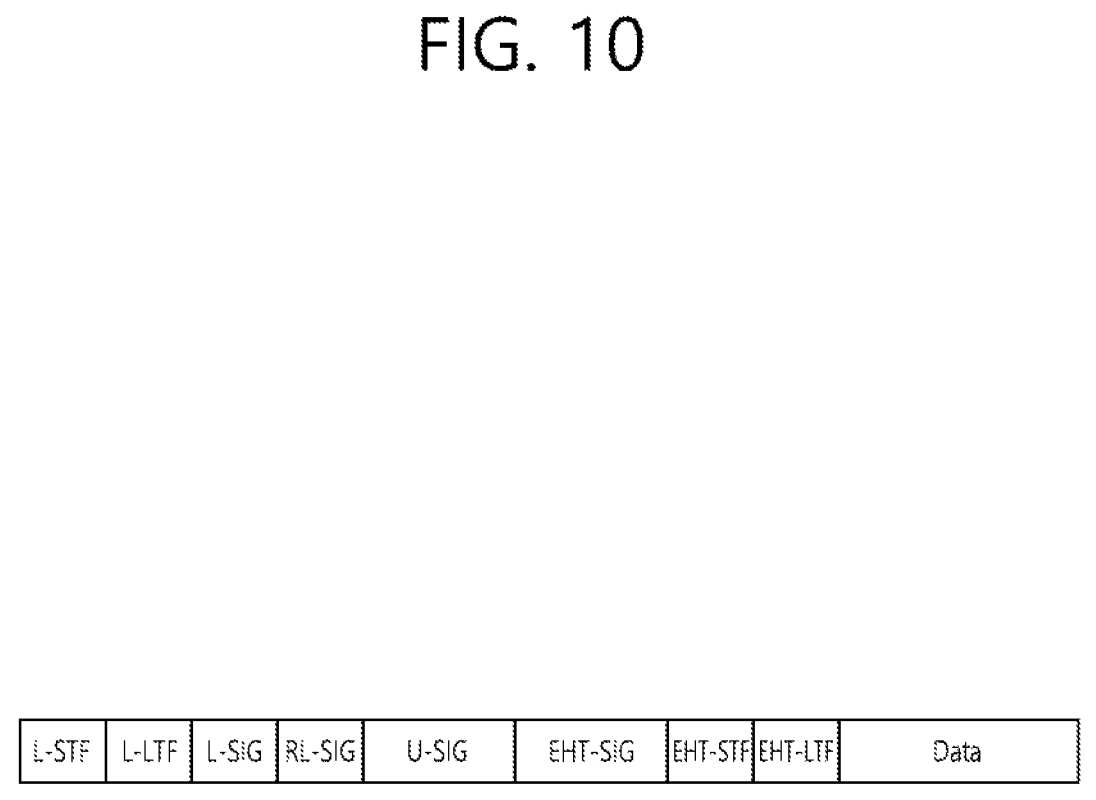

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tones and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. The EHT-STF of FIG. 10 may be used for improving automatic gain control estimation in a multiple input multiple output (MIMO) environment or an OFDMA environment. The EHT-LTF of FIG. 10 may be used for estimating a channel in the MIMO environment or the OFDMA environment.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BP SK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
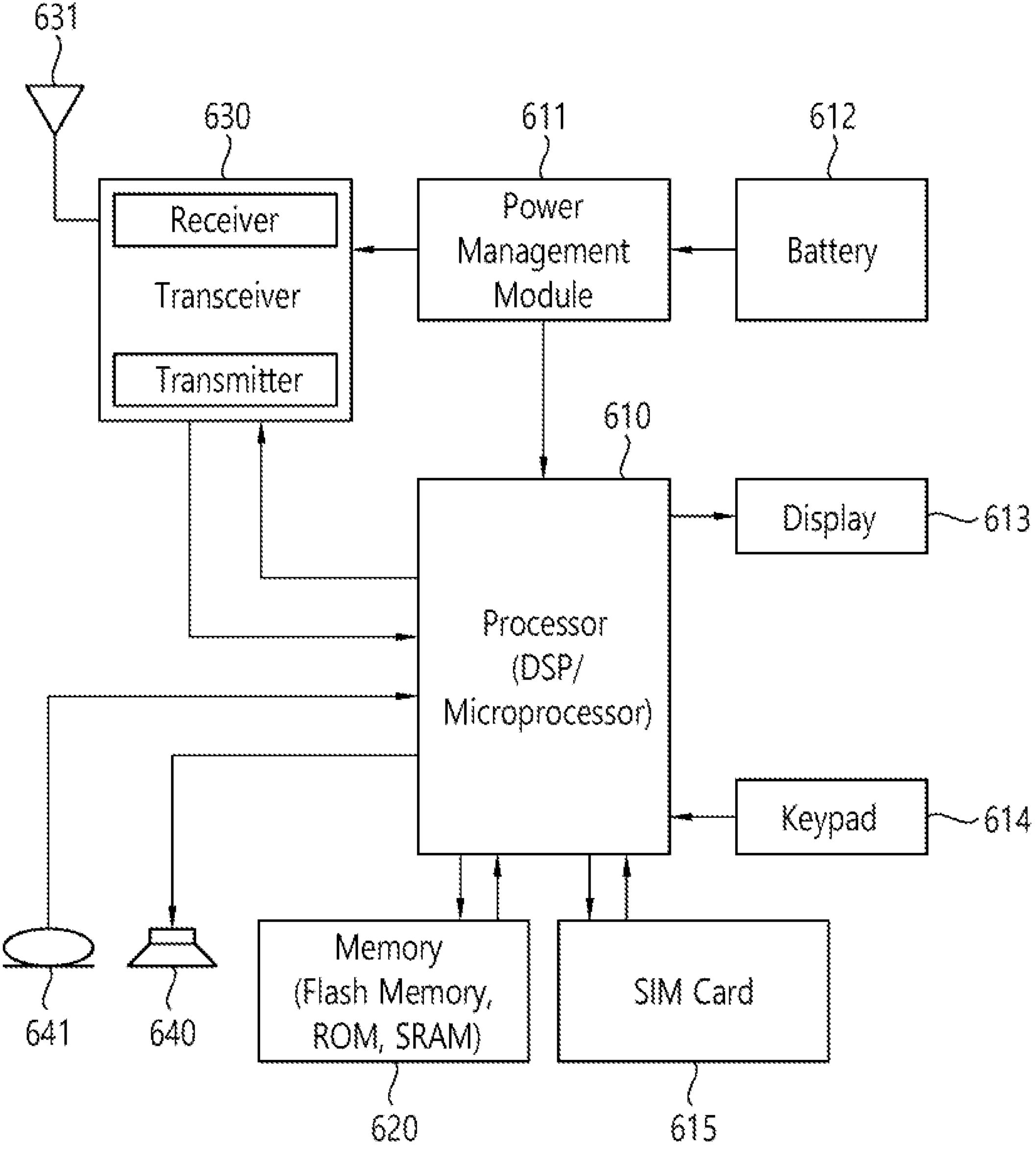
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

1. EHT Sounding Protocol

Transmit beamforming and DL MU-MIMO (DownLink Multi User-Multi Input Multi Output) require knowledge of channel conditions to calculate a steering matrix applied to the transmit signal to optimize reception at one or more receivers. The EHT STA determines channel state information using the EHT sounding protocol. The EHT sounding protocol provides explicit feedback mechanisms defined as EHT non-trigger-based (non-TB) sounding and EHT trigger-based (TB) sounding. Here, the EHT beamformee measures the channel using the training signal transmitted by the EHT beamformer (i.e., the EHT sounding NDP) and sends back a transformed estimate of the channel state. The EHT beamformer uses this estimate to derive a steering matrix.

The EHT beamformer returns an estimate of a channel state in an EHT compressed beamforming/CQI report included in one or more EHT Compressed Beamforming/CQI frames. There are three types of EHT compression beamforming/CQI report.

- SU feedback: EHT compression beamforming/CQI report consists of an EHT compression beamforming report field.
- MU feedback: EHT compression beamforming/CQI report consists of an EHT compression beamforming report field and an EHT MU Exclusive beamforming report field.
- CQI feedback: EHT compression beamforming/CQI report consists of an EHT CQI report field.

For reference, the use of EHT TB sounding does not necessarily mean MU feedback. EHT TB sounding is also used to obtain SU feedback and CQI feedback.

Figure 12:
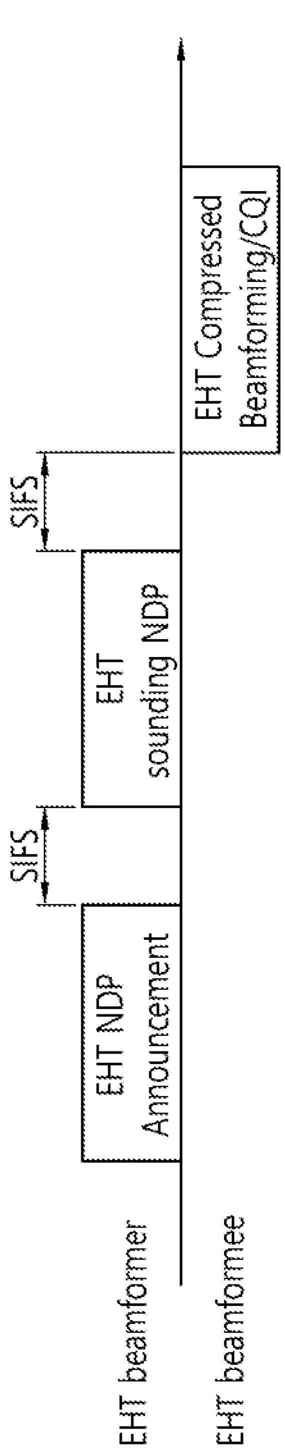
FIG. 12 shows an example of EHT non-TB sounding.

FIG. 12 shows an example of EHT non-TB sounding.

The EHT non-TB sounding sequence is initiated by the EHT beamformer using an individually addressed EHT NDP Announcement frame containing exactly one STA information field, and EHT sounding NDP is performed after SIFS. The EHT beamformer responds with an EHT Compressed Beamforming/CQI frame after SIFS.

The AID11 subfield of the STA information field must be set to the AID of the STA identified by the RA field of the EHT NDP Announcement frame, or set to 0 if the STA identified by the RA field is a mesh STA, AP, or IBSS STA.

An example of an EHT non-TB sounding sequence with a single EHT beamform is shown in FIG. 12.

Figure 13:
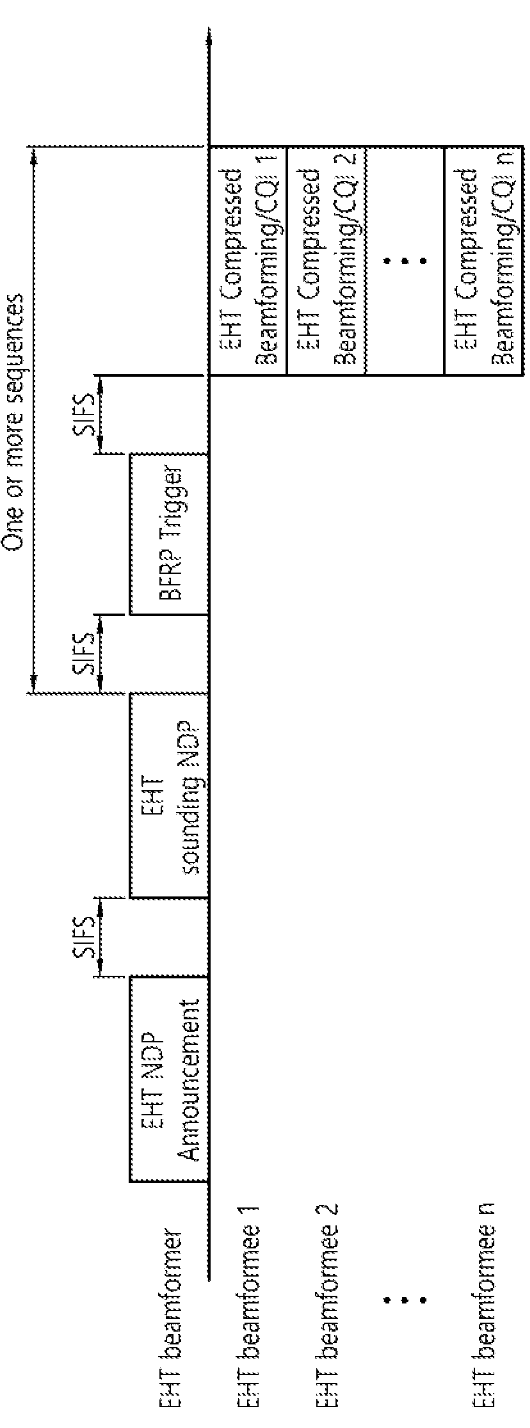
FIG. 13 shows an example of EHT TB sounding.

FIG. 13 shows an example of EHT TB sounding.

The EHT TB sounding sequence is initiated by the EHT beamformer using a broadcast EHT NDP Announcement frame with two or more STA information fields, an EHT sounding NDP is transmitted after the SIFS, and a BFRP (Beamforming Report) trigger frame following the SIFS is transmitted. The BFRP trigger frame transmitted within the EHT TB sounding sequence must request the EHT TB PPDU.

An example of an EHT TB sounding sequence with two or more EHT beamformes is shown in FIG. 13.

An EHT beamformer initiating an EHT TB sounding sequence must transmit an EHT NDP Announcement frame including two or more STA information fields and an RA field set to a broadcast address.

The EHT beamformer may initiate an EHT TB sounding sequence to request SU, MU or CQI feedback.

Figure 14:
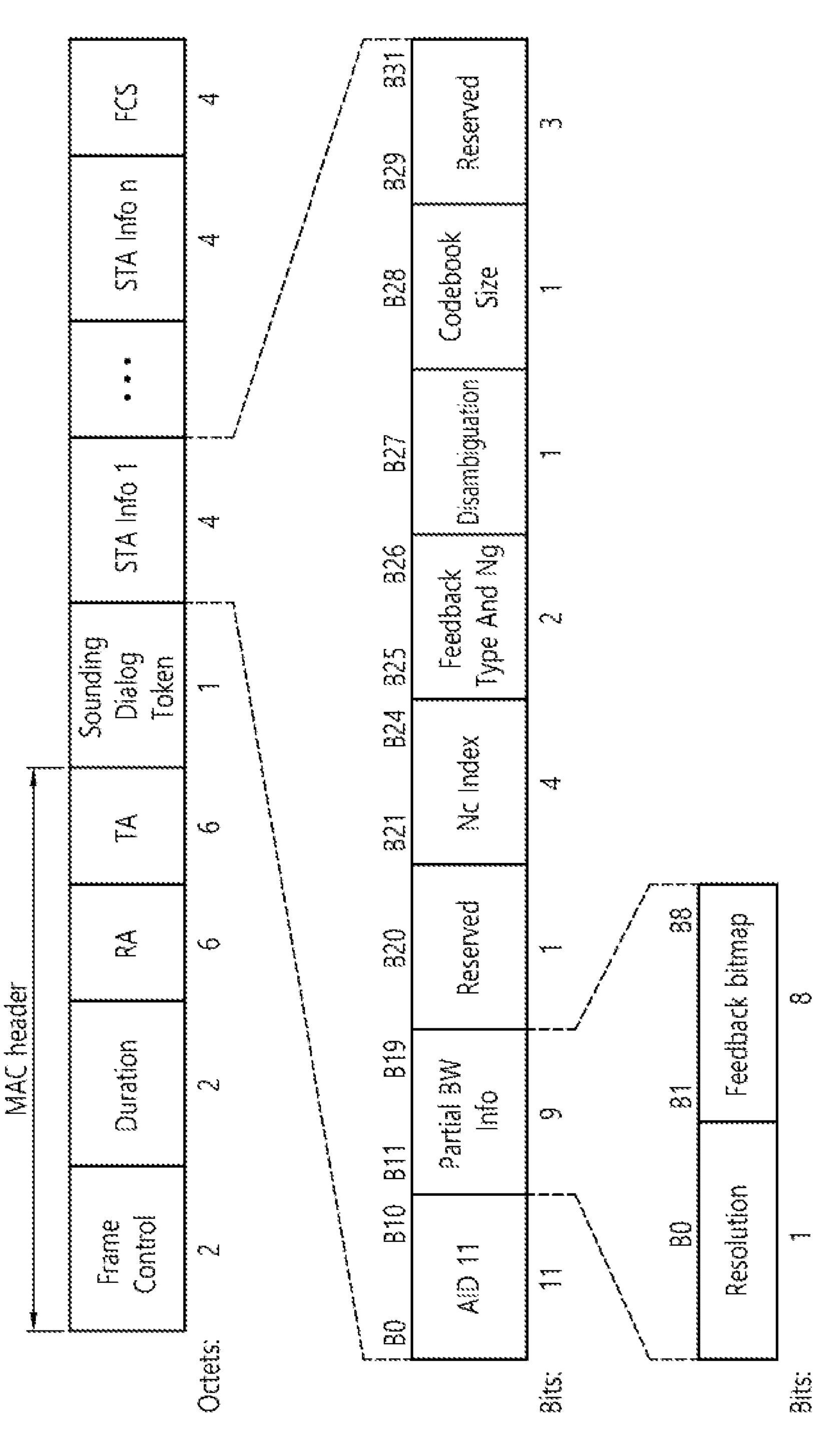
FIG. 14 shows an example of an EHT NDP Announcement frame format.

FIG. 14 shows an example of an EHT NDP Announcement frame format.

The VHT/HE/EHT NDP Announcement frame has three variants of a VHT NDP Announcement frame, a HE NDP Announcement frame, and an EHT NDP Announcement frame. Each variant is distinguished by the HE subfield setting and the Ranging subfield in the Sounding Dialog Token field.

The VHT/HE/EHT NDP Announcement frame includes at least one STA Info field. If the VHT/HE/EHT NDP Announcement frame includes only one STA Info field, the RA field is set to the address of an STA capable of providing feedback. If the VHT/HE/EHT NDP Announcement frame includes one or more STA Info fields, the RA field is set to a broadcast address.

The TA field is set to the address of the STA transmitting the VHT/HE/EHT NDP Announcement frame or the bandwidth signaling TA of the STA transmitting the VHT/HE/EHT NDP Announcement frame.

The Resolution subfield of the Partial BW Info subfield indicates the resolution bandwidth for each bit of the Feedback Bitmap subfield. The Feedback Bitmap subfield represents the request for each resolution bandwidth from the lowest frequency to the highest frequency, and B1 represents the lowest resolution bandwidth. Each bit in the Feedback Bitmap subfield is set to 1 when feedback is requested in the corresponding resolution bandwidth.

If the bandwidth of the EHT NDP Announcement frame is less than 320 MHz, set the Resolution bit B0 to 0 to indicate a resolution of 20 MHz.

- When the bandwidth of the EHT NDP Announcement frame is 20 MHz, B1 is set to 1 to indicate a feedback request for a 242-tone RU. B2-B8 are reserved and set to 0.
- When the bandwidth of the EHT NDP Announcement frame is 40 MHz, B1 and B2 indicate feedback requests for each of the two 242-tone RUs from low to high frequencies. B3-B8 are reserved and set to 0.
- When the bandwidth of the EHT NDP Announcement frame is 80 MHz, B1 to B4 represent feedback requests for each of the four 242-tone RUs from low to high frequencies. B5 to B8 are reserved and set to 0. If B1 to B4 are all set to 1, it indicates a feedback request for a 996-tone RU.
- When the bandwidth of the EHT NDP Announcement frame is 160 MHz, B1-B8 represent feedback requests for each of the eight 242-tone RUs from low to high frequencies. If B1 to B4 are all set to 1, it indicates a feedback request for the lower 996 tone RU, and if B5 to B8 are all set to 1, it indicates a feedback request to the upper 996 tone RU.

When the bandwidth of the EHT NDP Announcement frame is 320 MHz, the resolution bit B0 is set to 1 to indicate a resolution of 40 MHz. B1 to B8 represent feedback requests for each of the eight 484-tone RUs from low to high frequencies. When both B1 and B2 are set to 1, it indicates a feedback request for the lowest 996-tone RU, when both B3 and B4 are set to 1, it indicates a feedback request for the second lowest 996-tone RU, when both B5 and B6 are set to 1, it indicates a feedback request for the second highest 996-tone RU, and when both B7 and B8 are set to 1, it indicates a feedback request for the highest 996-tone RU. Partial BW Info subfields are defined in the table below.

TABLE 3

| Operating channel width of the EHT beamformee (MHZ) | Bandwidth of the EHT NDP Announcement frame (MHZ) | Feedback RU/MRU size | Partial BW Info subfield values |
|---|---|---|---|
| 20, 40, 80, 160, 320 | 20 | 242 | 010000000 |
| 20, 40, 80, 160, 320 | 40 | 242 | 010000000, 001000000 |
| | | 484 | 011000000 |
| 20, 80, 160, 320 | 80 | 242 | 010000000, 001000000, 000100000, 000010000 |
| | | 484 | 011000000, 000110000 |
| | | 484 + 242 | 011100000, 011010000, 010110000, 001110000 |
| | | 996 | 011110000 |

TABLE 3-continued

| Operating channel width of the EHT beamformee (MHZ) | Bandwidth of the EHT NDP Announcement frame (MHZ) | Feedback RU/MRU size | Partial BW Info subfield values |
|---|---|---|---|
| 20, 80, 160, 320 | 160 | 242 | 010000000, 001000000, 000100000, 000010000, 000001000, 000000100, 000000010, 000000001 |
| | | 484 | 011000000, 000110000, 000001100, 000000011 |
| | | 484 + 242 | 011100000, 011010000, 010110000, 001110000, 000001110, 000001101, 000001011, 000000111 |
| | | 996 | 011110000, 000001111 |
| | | 996 + 484 | 011111100, 011110011, 011001111, 000111111 |
| | | 996 + 484 + 242 | 011101111, 011011111, 010111111, 001111111 011111110, 011111101, 011111011, 011110111 |
| | | 2 × 996 | 011111111 |
| 80, 160, 320 | 320 | 484 | 110000000, 101000000, 100100000, 100010000, 100001000, 100000100, 100000010, 100000001 |
| | | 996 | 111000000, 100110000, 100001100, 100000011 |
| | | 996 + 484 | 111100000. 111010000, 110110000, 101110000, 100001110, 100001101, 100001011, 100000111 |
| | | 2 × 996 | 111110000, 100001111 |
| | | 2 × 996 + 484 | 111111000, 111110100, 111101100, 111011100, 110111100, 101111100, 100111110, 100111101, 100111011, 100110111, 100101111, 100011111 |
| | | 3 × 996 | 111111100, 111110011, 111001111, 100111111 |
| | | 3 × 996 + 484 | 111111110, 111111101, 111111011, 111110111, 111101111, 111011111, 110111111, 101111111 |
| | | 4 × 996 | 111111111 |

FIG. 15 shows an example of an EHT MIMO Control field format.

Subfields of the EHT MIMO Control field may be defined as follows.

When the Feedback Type subfield of FIG. 15 indicates SU or MU, the Nc Index subfield indicates a value (Nc-1) obtained by subtracting 1 from the number of columns of the compressed beamforming feedback matrix. If the Feedback Type subfield indicates CQI, the Nc Index subfield indicates the number of spatial streams (Nc) in the CQI report and is set to Nc-1. Nc Index subfield values of 7 or more are reserved.

When the Feedback Type subfield of FIG. 15 indicates SU or MU, the Nr Index subfield indicates a value (Nr-1) obtained by subtracting 1 from the number of rows of the compressed beamforming feedback matrix. Values 0 and 8-15 are reserved. If the Feedback Type subfield indicates CQI, the Nr Index subfield is reserved.

The BW subfield of FIG. 15 indicates the channel width used to determine the start and end subcarriers when interpreting the Partial BW Info subfields. The value of the BW subfield corresponds to the bandwidth of the EHT NDP and is set to 0 for 20 MHz, 1 for 40 MHz, 2 for 80 MHz, 3 for 160 MHz, and 4 for 320 MHz.

If the Feedback Type subfield indicates SU or MU, the Grouping subfield indicates subcarrier grouping Ng used for the compressed beamforming feedback matrix, and is set to 0 if Ng=4 and set to 1 if Ng=16. If the Feedback Type subfield indicates CQI, the Grouping subfield is reserved.

The Partial BW Info subfield is defined in the format at the bottom of FIG. 14. The resolution bit indicates the feedback resolution bandwidth. The Resolution bit is set to 0 to indicate a resolution of 20 MHz when the BW subfield is set to 0 to 3, and is set to 1 to indicate a resolution of 40 MHz when the BW subfield is set to 4. The Feedback Bitmap subfield indicates each resolution bandwidth for which the beamformer requests feedback. Each bit in the Feedback Bitmap subfield is set to 1 if feedback for the corresponding bandwidth is requested and set to 0 otherwise.

The EHT Compressed Beamforming Report field conveys the average SNR (Signal to Noise Ratio) of each spatial stream and the compressed beamforming feedback matrix V to be used by the transmit beamformer to determine the steering matrix Q as follows.

The size of the EHT Compressed Beamforming Report field varies according to the value of the EHT MIMO Control field. The EHT Compressed Beamforming Report field includes a continuous (length may be 0) part in case of EHT compressed beamforming report information or segmented EHT compressed beamforming/CQI report. If the Feedback Type subfield of the EHT MIMO Control field indicates SU or MU, the EHT compressed beamforming report information is included in the EHT Compressed Beamforming/CQI report.

The EHT Compressed Beamforming Report information includes first matrix angle and channel matrix elements indexed by data and pilot subcarrier indices from the lowest frequency to the second highest frequency.

Here, Nc is the number of columns of the compressed beamforming feedback matrix determined by the Nc Index subfield of the EHT MIMO Control field, and Nr is the number of rows of the compressed beamforming feedback matrix determined by the Nr Index subfield of the EHT MIMO control field.

Ns is the number of subcarriers through which the compressed beamforming feedback matrix is transmitted back to the beamformer. Depending on which of the beamformer or beamformer determines the feedback parameter, the beamformer or beamformer uses a method called grouping in which only a single compressed beamforming feedback matrix is reported for each group of Ng contiguous subcarriers, reduce Ns. Ns is a function of the BW, Partial BW Info, and Grouping subfields of the EHT MIMO Control field.

The subcarrier index scidx(i), i=0, 1, . . . , Ns−1, is a concatenation of subcarrier indices for each 242 tone RU or 996 tone RU in frequency order, it is identified as the Partial BW Info subfield along with the BW and Grouping subfields. The subcarrier index for each 242-tone RU or 996-tone RU is defined as shown in the table below.

When the feedback request does not cover the entire 80 MHz subblock, the subcarrier index is as follows.

TABLE 4

| 242-tone RU index | | 20 MHz | 40 MHz | 80 MHz | 160 MHz | 320 MHz |
|---|---|---|---|---|---|---|
| 1 | Ng = 4 | [−122, −120:4:−4, −2, 2, 4:4:120, 122] | [−244:Ng:−4] | [−500:Ng:−260] | [−1012:Ng:−772] | [−2036:Ng:−1796] |
| | Ng = 16 | [−122, −116:16:−4, −2, 2, 4:16:116, 122] | | | | |
| 2 | | | [4:Ng:244] | [−252:Ng:−12] | [−764:Ng:−524] | [−1788:Ng:−1548] |
| 3 | | | | [12:Ng:252] | [−500:Ng:−260] | [−1524:Ng:−1284] |

TABLE 5

| 242-tone RU index | 20 MHZ | 40 MHZ | 80 MHZ | 160 MHZ | 320 MHZ |
|---|---|---|---|---|---|
| 4 | | | [260:Ng:500] | [−252:Ng:−12] | [−1276:Ng: −1036] |
| 5 | | | | [132:Ng:252] | [−1012:Ng: −772] |
| 6 | | | | [260:Ng:500] | [−764:Ng: −524] |
| 7 | | | | [524:Ng:764] | [−500:Ng: −260] |
| 8 | | | | [772:Ng:1012] | [−252:Ng:−12] |
| 9 | | | | | [12:Ng:252] |
| 10 | | | | | [260:Ng:500] |
| 11 | | | | | [524:Ng:764] |
| 12 | | | | | [772:Ng:1012] |
| 13 | | | | | [1036:Ng: 1276] |
| 14 | | | | | [1284.Ng: 1524] |
| 15 | | | | | [1548:Ng: 1788] |
| 16 | | | | | [1796:Ng: 2036] |

NOTE
Ng: denotes an arithmetic progression in Ng increments.

When the feedback request covers the entire 80 MHz subblock and Ng=4, the subcarrier index is as follows.

TABLE 6

| 996-tone RU index | 80 MHZ | 160 MHZ | 320 MHZ |
|---|---|---|---|
| 1 | [−500.4:−4, 4:4:500] | [−1012:4:−516, −508:4:−12] | [−2036:4:−1540, −1532:4:−1036] |
| 2 | | [12:4:508, 516:4:1012] | [−1012:4:−516, −508:4:−12] |
| 3 | | | [12:4:508, 516:4:1012] |
| 4 | | | [1036:4:1532, 1540:4:2036] |

When the feedback request covers the entire 80 MHz subblock and Ng=16, the subcarrier index is as follows.

TABLE 7

| 996-tone RU index | 80 MHZ | 160 MHZ | 320 MHZ |
|---|---|---|---|
| 1 | [−500:16:−260, −252:16:−12, −4, 4, 12:16:252, 260:16:500] | [−1012:16:−772, −764:16:−524, −516, −508, −500:16:−260, −252:16:12] | [−2036:16:−1796, −1788:16:−1548, −1540, −1532, −1524:16:−1284, −1276:36:−1036] |
| 2 | | [12:16:252, 260:16:500, 508, 516, 524:16:764, 772:16:1012] | [−1012:16:−772, −764:16:−524, −516, −508, −500:16:−260, −252:16:−12] |
| 3 | | | [12:16:252, 260:16:500, 508, 516, 524:16:764, 772:16:1012] |
| 4 | | | [1036:16:1276, 1284:16:1524, 1532, 1540, 1548:16:1788, 1796:16:2036] |

2. Embodiment Applicable to the Present Disclosure

The WLAN 802.11 system considers transmission of an increased stream using a band wider than that of the existing 11ax or more antennas to increase the peak throughput. In addition, the present specification also considers a method of aggregating and using various bands/links.

In the existing 802.11ax, in order to transmit SU/MU MIMO PPDU, a Q matrix can be configured using channel information, and for this, a procedure for receiving sounding and channel information feedback is required. At this time, NDP can be used for PPDU for sounding. The procedure for this has been described in detail above. In particular, the feedback tone may vary according to Ng, and in 802.11ax, the feedback tone according to each bandwidth is defined, which is also described above.

In 802.11be, a tone plan different from 802.11ax is used, and since wide bandwidth can be used and up to 16 streams can be transmitted, a new Ng to reduce feedback overhead may be considered.

Figure 16:
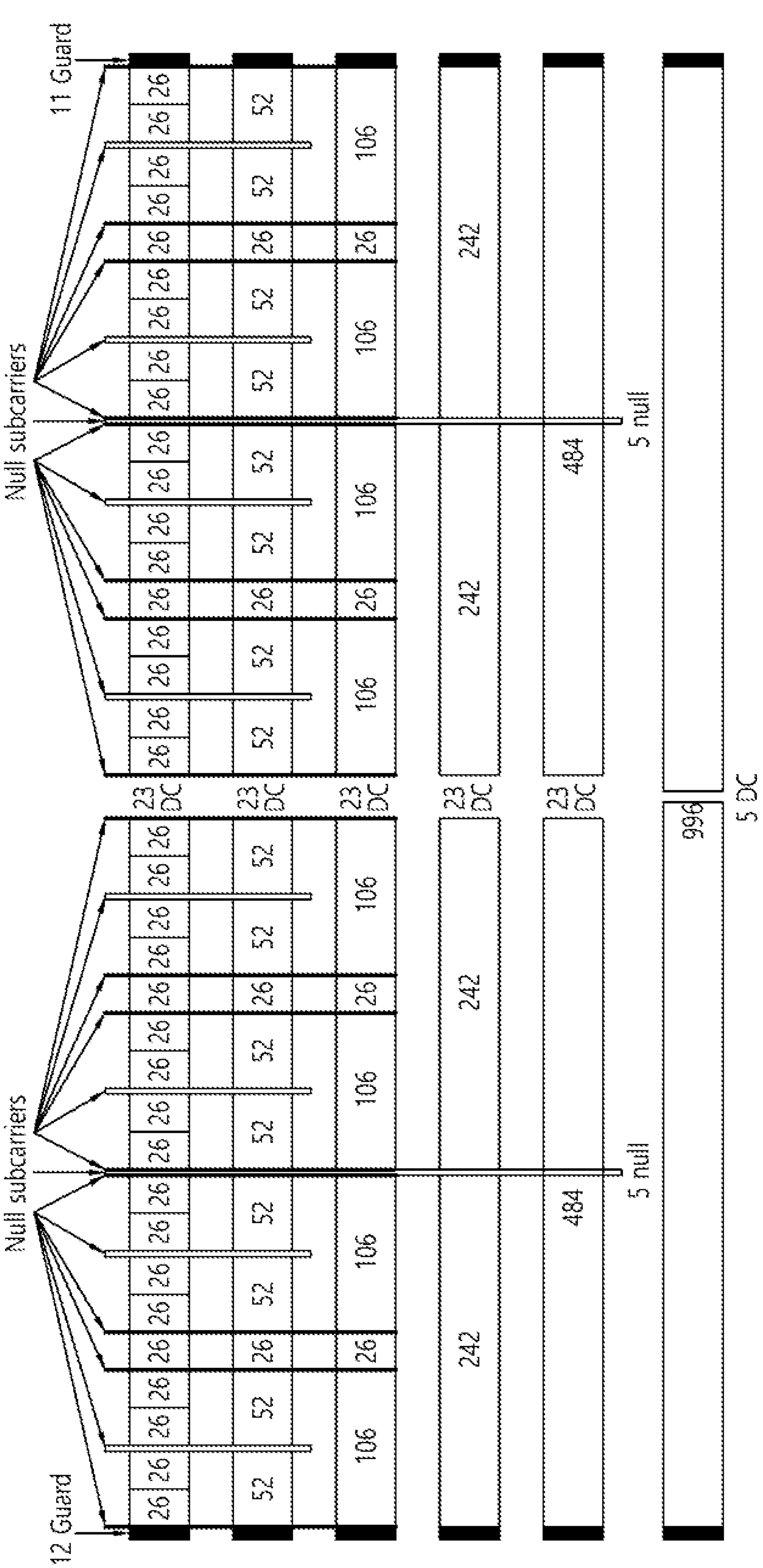
FIG. 16 shows a tone plan for an 80 MHz PPDU of an 802.11be wireless LAN system.

FIG. 16 shows a tone plan for an 80 MHz PPDU of an 802.11be wireless LAN system.

Tone plans and RU locations for 20 MHz and 40 MHz PPDUs in the 802.11be wireless LAN system are the same as those in the 802.11ax wireless LAN system. FIG. 16 shows EHT tone plans and RU locations for 80 MHz PPDUs. An EHT PPDU extended to a band of 160 MHz or higher consists of a plurality of 80 MHz subblocks. The tone plan for each 80 MHz subblock is the same as that of the 80 MHz EHT PPDU. If the 80 MHz subblock in the 80/160/320 MHz PPDU is not punctured and the entire 80 MHz subblock is used as a RU or part of an RU or MRU, the 80 MHz subblock uses the 996 tone RU shown in FIG. 16. If an 80 MHz subblock in an 80/160/320 MHz PPDU is punctured or the entire 80 MHz subblock is not used as part of RU or RU or MRU, the 80 MHz subblock uses a tone plan except for 996 tone RU in FIG. 16.

In an 80 MHz EHT PPDU, indices of data and pilot subcarriers of RUs are fixed as follows. In the table below, a subcarrier having a subcarrier index of 0 corresponds to a DC tone. A subcarrier having a negative subcarrier index corresponds to a subcarrier having a frequency lower than that of the DC tone. A subcarrier having a positive subcarrier index corresponds to a subcarrier having a higher frequency than the DC tone.

TABLE 8

| RU type | RU index and subcarrier range | | | | |
|---|---|---|---|---|---|
| 26-tone | RU 1 [−499: −474] | RU 2 [−473: −448] | RU 3 [−445: −420] | RU 4 [−419: −394] | RU 5 [−392: −367] |
| | RU 6 [−365: −340] | RU 7 [−339:−314] | RU 8 [−311: −286] | RU 9 [−285: −260] | |
| | RU 10 [−252: −227] | RU 11 [−226: −201] | RU 12 [−198: −173] | RU 13 [−172: −147] | RU 14 [−145: −120] |
| | RU 15 [−118: −93] | RU 16 [−92: −67] | RU 17 [−64: −39] | RU 18 [−38: −13] | RU 19 [not defined] |
| | RU 20 [13: 38] | RU 21 [39: 64] | RU 22 [67: 92] | RU 23 [93: 118] | RU 24 [120: 145] |
| | RU 25 [147: 172] | RU 26 [173: 198] | RU 27 [201: 226] | RU 28 [227: 252] | |
| | RU 29 [260: 285] | RU 30 [286: 311] | RU 31 [314: 339] | RU 32 [340: 365] | RU 33 [367: 392] |
| | RU 34 [394: 419] | RU 35 [420: 445] | RU 36 [448: 473] | RU 37 [474: 499] | |
| 52-tone RU | RU 1 [−499: −448] | RU 2 [−445: −394] | RU3 [−365: −314] | RU 4 [−311: −260] | |
| | RU 5 [−252: −201] | RU 6 [−198: −147] | RU 7 [−118: −67] | RU 8 [−64: −13] | |
| | RU 9 [13: 64] | RU 10 [67: 118] | RU 11 [147: 198] | RU 12 [201: 252] | |
| | RU 13 [260: 311] | RU 14 [314: 365] | RU 15 [394: 445] | RU 16 [448: 499] | |
| 106-one RU | RU 1 [−499: −394] | RU 2 [−365: −260] | RU 3 [−252: −147] | RU 4 [−118: −13] | |
| | RU 5 [13: 118] | RU 6 [147: 252] | RU 7 [260: 365] | RU 8 [394: 499] | |
| 242-tone RU | RU 1 [−500: −259] | RU 2 [−253: −12] | RU 3 [12: 253] | RU 4 [259: 500] | |
| 484-tone RU | RU 1 [−500: −259], −253: −12] | RU 2 [12: 253, 259: 500] | | | |
| 996-tone RU | RU 1 [−500: −3, 3: 500] | | | | |

Meanwhile, in order to receive feedback on the channel state, the AP may indicate the STA with information on the corresponding NDP by transmitting an NDPA before transmitting the NDP. In this case, the present specification proposes a method of configuring a partial BW info field, which is a field for requesting feedback from only partial channels.

The partial BW info field of NDPA is a field for requesting feedback for partial channels rather than the entire BW. In 802.11ax, partial BW feedback was requested in units of 26 RU (Resource Units), but in 802.11be, in order to increase efficiency, it was decided to request partial BW feedback in units of 242 RUs as shown in Tables 4 and 5 above. In addition, 802.11be also proposes a method of requesting partial BW feedback in units of 996 RUs as shown in Tables 6 and 7 above when the partial BW feedback request covers the entire 80 MHz subblock.

Figure 17:
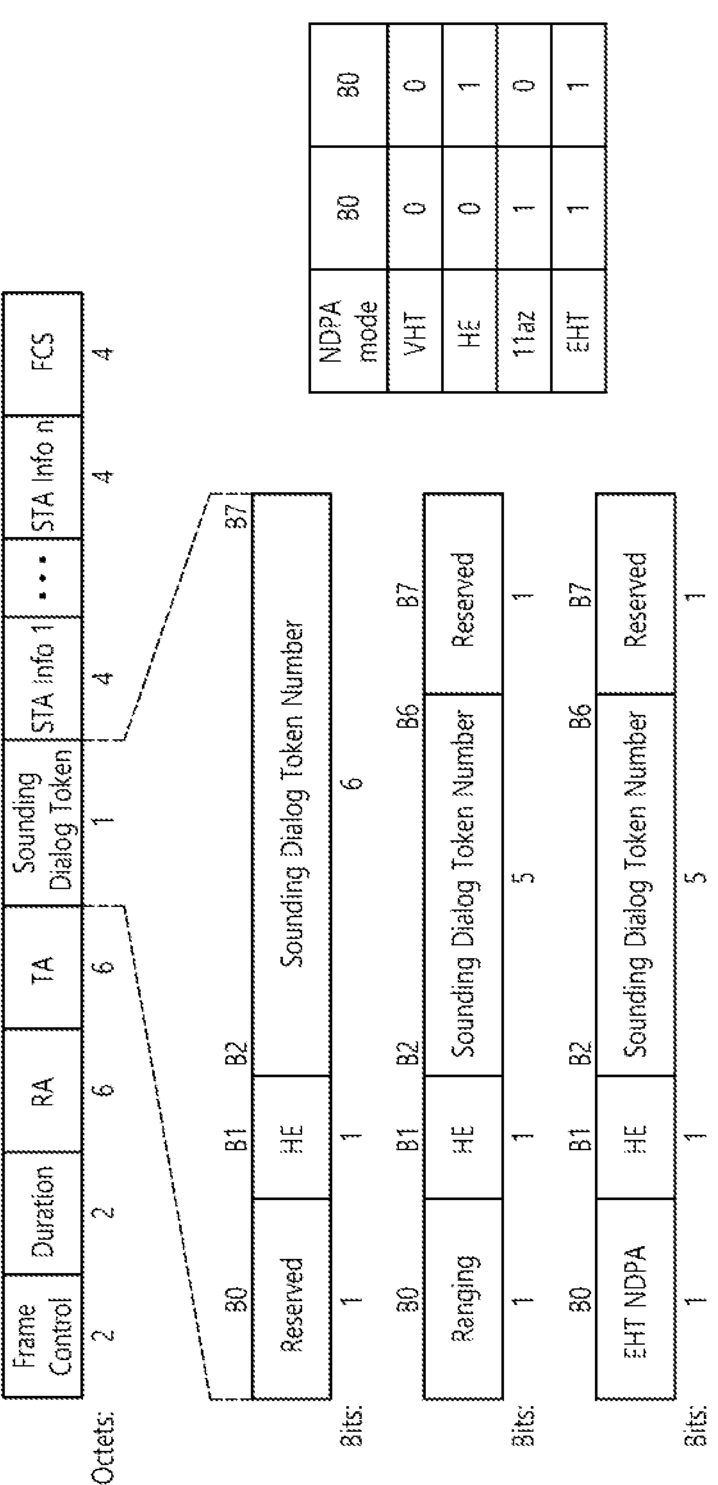
FIG. 17 shows an example of an NDPA frame format defined by 802.11be.

FIG. 17 shows an example of an NDPA frame format defined by 802.11be.

The NDPA frame located at the top of FIG. 17 is the same as the EHT NDPA frame of FIG. 14. The Sounding Dialog Token field of FIG. 17 consists of 1 octet (or 8 bits), and the NDPA mode can be changed to VHT/HE/802.11az/EHT according to the values of B0 and B1. The Sounding Dialog Token Number field included in the Sounding Dialog Token field includes a value selected by a beamformer for identifying an NDPA frame.

Figure 18:
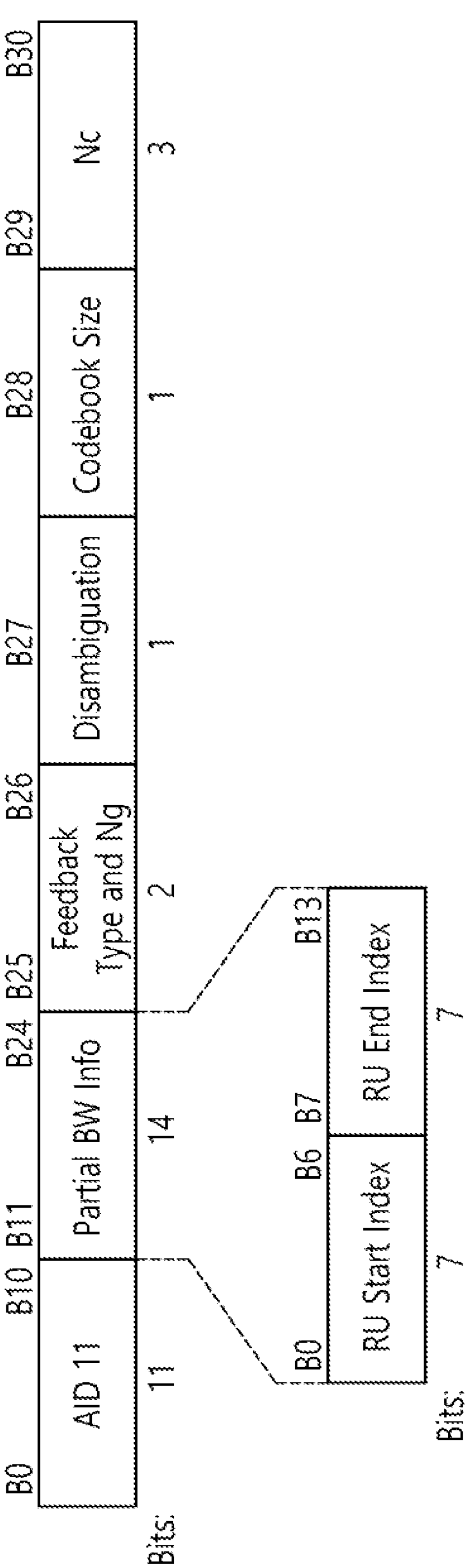
FIG. 18 shows an example of the STA Info field format of the HE NDPA frame.

FIG. 18 shows an example of the STA Info field format of the HE NDPA frame.

If the AID11 subfield of the HE NDPA frame is not set to 2047, the format of the STA Info field is configured as shown in the upper part of FIG. 18. If the AID11 subfield is not 2047, the identifier of the STA expected to process the HE sounding NDP and prepare for sounding feedback is included in AID11.

The Partial BW Info subfield included in the STA Info field of the HE NDPA frame is configured as shown in the lower part of FIG. 18, and consists of a total of 14 bits including a 7-bit RU Start Index subfield and a 7-bit RU End Index subfield. The RU Start Index subfield and the RU End Index subfield could request partial BW feedback in 26 RU units according to the bandwidth of the HE NDPA frame. However, since the existing Partial BW Info subfield consists of 14 bits and the Disallowed Subchannel Bitmap subfield had to be defined separately when puncturing was to be considered, there was a problem that a rather large feedback overhead could occur. In addition, according to Table 3, even in the 802.11be wireless LAN system, when the bandwidth of the EHT NDPA frame is 320 MHz, it also has a limitation that partial BW feedback can be requested only in units of 40 MHz. Therefore, this specification proposes a method of requesting partial BW feedback in various RU/MRU situations by newly configuring the Partial BW Info field in the STA Info field of the EHT NDPA frame.

Figure 19:
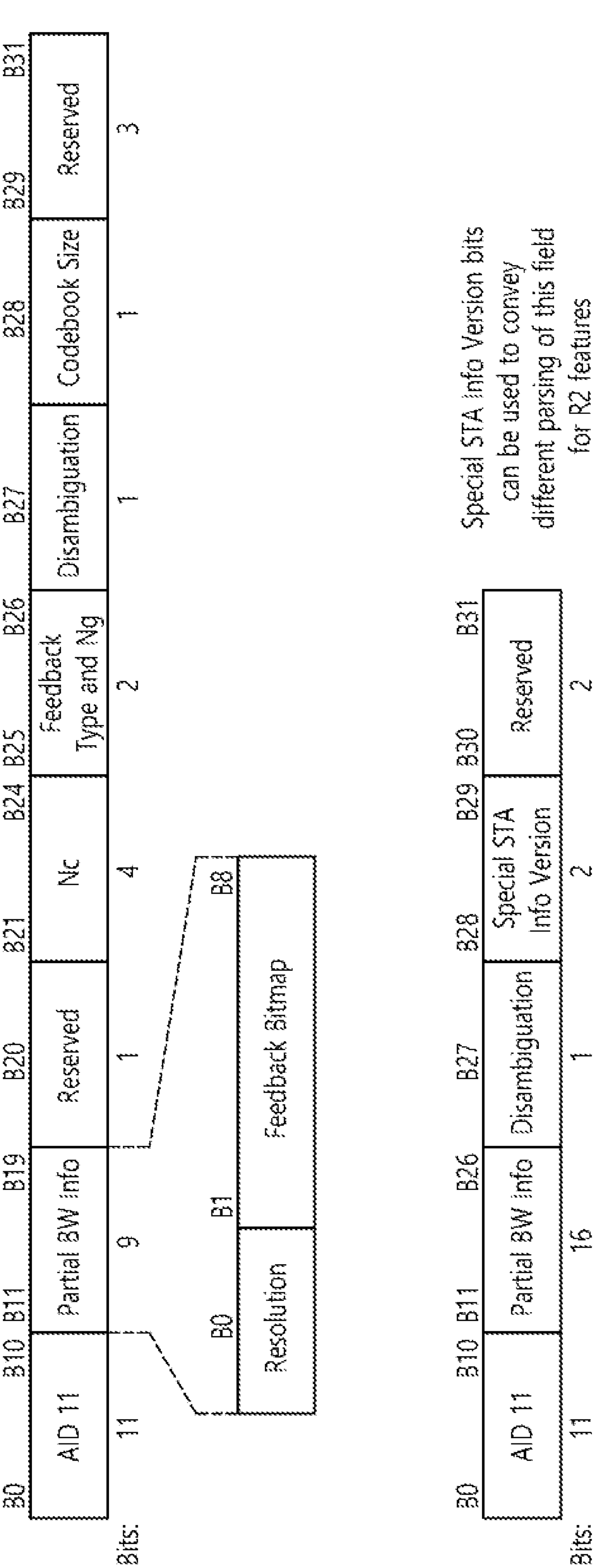
FIG. 19 shows an example of the STA Info field format of the EHT NDPA frame proposed in this specification.

FIG. 19 shows an example of the STA Info field format of the EHT NDPA frame proposed in this specification.

The upper part of FIG. 19 shows the format of the STA Info field when the AID11 subfield is not set to a special value (e.g., 2044). In this case, the STA Info field includes a Partial BW Info field, and the Partial BW Info field is defined as a 9-bit bitmap.

The lower part of FIG. 19 shows the format of the STA Info field when the AID11 subfield is set to a special value. At this time, the STA Info field includes special information, and specific details of the special information are being discussed in the next-generation wireless LAN system.

The Partial BW Info field includes a 1-bit resolution bit and an 8-bit feedback bitmap. The resolution bit may indicate a resolution bandwidth (20 MHz or 40 MHz) for each bit of the feedback bitmap. If the bandwidth of the NDP frame is less than 320 MHz, the feedback unit is 20 MHz (242 RU) and the Resolution bit is set to 0. When the bandwidth of the NDP frame is 320 MHz, the feedback unit is 40 MHz (484 RU) and the Resolution bit is set to 1.

The 8-bit feedback bitmap may indicate a feedback request for each resolution bandwidth from the lowest frequency to the highest frequency. When B0=0, the 8-bit feedback bitmap indicates a feedback request for each 20 MHz subchannel within 160 MHz. When B0=1, the 8-bit feedback bitmap indicates a feedback request for each 40 MHz subchannel within 320 MHz. Each bit of the feedback bitmap is set to 1 when feedback is requested in the corresponding resolution bandwidth.

For example, when the bandwidth of the EHT NDPA frame is less than 320 MHz, the Resolution bit B0 is set to 0 to indicate a resolution of 20 MHz.

When the bandwidth of the EHT NDPA frame is 20 MHz, B1 is set to 1 to indicate a feedback request for 242 RU, and B2-B8 are reserved.

When the bandwidth of the EHT NDPA frame is 40 MHz, B1 and B2 indicate a feedback request for each of two 242 RUs from a low frequency to a high frequency, and B3-B8 are reserved.

When the bandwidth of the EHT NDPA frame is 80 MHz, B1-B4 indicate a feedback request for each of four 242 RUs from low to high frequencies, and B5-B8 are reserved. In this case, when B1-B4 are all set to 1, B1-B4 indicates a feedback request for 996 RUs.

If the bandwidth of the EHT NDPA frame is 160 MHz, B1-B8 indicate a feedback request for each of 8 242 RUs from a low frequency to a high frequency. At this time, when B1-B4 are all set to 1, B1-B4 indicates a feedback request for a low 996 RU. When B5-B8 are all set to 1, B5-B8 indicate a feedback request for a high 996 RU.

When the bandwidth of the EHT NDPA frame is 320 MHz, the Resolution bit B0 is set to 1 to indicate a resolution of 40 MHz. B1-B8 indicate feedback requests for each of the eight 484 RUs from low to high frequencies. At this time, when both B1 and B2 are set to 1, B1 and B2 indicate a feedback request for the lowest 996 RU. When both B3 and B4 are set to 1, B3 and B4 indicate a feedback request for the second lowest 996 RU. When both B5 and B6 are set to 1, B5 and B6 indicate a feedback request for the second highest 996 RU. When both B7 and B8 are set to 1, B7 and B8 indicate a feedback request for the highest 996 RU.

Specific values of the Partial BW Info subfield are defined in Table 3 above.

FIG. 20 shows an RU/MRU that can request partial BW feedback through a Partial BW Info field.

Referring to FIG. 20, when the resolution bit B0 is set to 0, each bit of the feedback bitmap indicates a feedback request for a corresponding 242 RU. When the resolution bit B0 is set to 1, each bit of the feedback bitmap indicates a feedback request for the corresponding 484 RU. For example, if the bitmap is 001000000, the beamformer may request feedback for the second 242 RUs. If the bitmap is 111110000, the beamformer may request feedback for 996×2 RU (484+484+484+484 RU).

However, the problem of the bitmap of the Partial BW Info field as shown in FIG. 20 is that partial BW feedback of 20 MHz resolution cannot be considered in a 320 MHz bandwidth. In addition, when requesting partial BW feedback for combinations (484+242 MRU, 996+484+242 MRU) in which 242 RUs are used among MRUs of 2×996 size or smaller, a feedback request at secondary 160 MHz or higher 160 MHz of 320 MHz bandwidth may not be considered. To compensate for this, a 9-bit partial BW feedback bitmap is proposed as follows.

Suggestion 1

It is assumed that the partial BW info field consists of 9 bits of B0 to B8.

B0 is used to indicate a specific 80 MHz channel and is defined in more detail below.

B1 to B4 indicate feedback for partial or all RUs within each 80 MHz channel and are defined in more detail below. Each of B1 to B4 can correspond to primary 80 MHz, secondary 80 MHz corresponding to primary 80 (or lower 80 MHz) among secondary 160 MHz, corresponding to secondary 80 (or higher 80 MHz) among secondary 160 MHz in order, or correspond from a lowest 80 MHz channel to a highest 80 MHz channel.

B5 to B8 indicate feedback for each 20 MHz (242 RU) in a specific 80 MHz channel, and if set to 1, feedback is requested, and if set to 0, it may mean not requested. It is defined in more detail below. Each of B5 to B8 may correspond to a low 20 MHz channel to a high 20 MHz channel in order.

1) When B1~B4 are all 1
   - B0: It has no special meaning and can be set to any value among 0 or 1 or reserved.
   - B1~B4: 1 means a full 80 MHz (996RU) feedback request.
   - B5~B8: It has no special meaning and can be set to any value among 0 or 1 or reserved.
   - Ex) 0 1111 0000: 4×996 (all 320 MHz feedback requests)
2) When only one of B1~B4 values is 0
   - B0: It has no special meaning and can be set to any value among 0 or 1 or Reserved.
   - B1~B4: 1 means a feedback request for the entire 80 MHz (996 RU), and 0 means a feedback request for 242 RUs of a part of the 80 MHz channel.
   - B5~B8: Indicates each 20 MHz (242 RU) feedback in the 80 MHz channel with a value of 0 among B1~B4.
   - Ex1) B0~B8: 0 1110 1100: 3×996+484 (In the highest 80 MHz, feedback is request only at the low frequency 40 MHz (484 RU or two 242 RU))
   - Ex2) B0~B8: 0 1101 0000: 3×996 (Feedback is not requested at the second highest
3) When only two of B1~B4 values are 0
   - B0: If B0 is 0, it indicates feedback for the lowest 80 MHz channel in terms of bits among the 80 MHz channels corresponding to the value of 0 among B1 to B4. If B0 is 1, it indicates feedback for the 80 MHz channel with a higher bit level among 80 MHz channels corresponding to a value of 0 among B1 to B4. Also, the value of B0 may indicate the opposite case.
   - B1~B4: 1 of B1~B4 means a feedback request for the entire 80 MHz (996 RU), and 0 of B1~B4 means a feedback request for 242 RU of some of the 80 MHz channels (80 MHz channel indicated by B0) or means that feedback of the entire 80 MHz channel (996 RU) is not requested.
   - B5~B8: Indicate feedback for each 20 MHz (242 RU) in the 80 MHz channel indicated by B0.
   - Ex1) B0~B8: 0 1100 1100: 2×996+484 (Feedback is not requested at the highest 80 MHz, and feedback is requested only for the low frequency 40 MHz (484 RU or two 242 RUs) at the second highest 80 MHz)
   - Ex2) B0~B8: 1 0011 0000: 2×996 (Feedback is not requested in the first and second lowest 80 MHz, B5~B8 indicate feedback for 20 MHz (242 RU) for the second lowest 80 MHz or 0000, which may be equivalent to no feedback request)
4) When only 3 of B1~B4 values are 0
   - B0: 1 indicates an 80 MHz channel corresponding to a value of 1 among B1 to B4, and 0 indicates an 80 MHz channel consisting of a 160 MHz channel together with an 80 MHz channel corresponding to a value of 1 among B1 to B4. Also, the value of B0 may indicate the opposite case.
   - B1~B4: When B0 is 0, 1 of B1~B4 means a feedback request for the entire 80 MHz (996RU), and 0 of B1~B4 means a feedback request for 242 RU of some of the 80 MHz channels (indicated by B0 80 MHz channel part) or means that feedback of the entire 80 MHz channel (996 RU) is not requested.

When B0 is 1, 1 in B1 to B4 means a feedback request for 242 RU of a part of the channel (the 80 MHz channel part indicated by B0), and 0 in B1 to B4 means the entire channel (996 RU) means not requesting for feedback.

B5~B8: Indicate each 20 MHz (242 RU) feedback in the 80 MHz channel indicated by B0.

Ex1) B0~B8: 0 1000 1110: 996+484+242 (Feedback is not requested at the first and second high 80 MHz, only the low frequency 60 MHz (484+242 MRU or three 242 RU) feedback is requested in the second low 80 MHz, feedback is requested for the entire 80 MHz (996 RU) in the lowest 80 MHz)

Ex2) B0~B8: 0 0001 0011: 996+484 (Feedback is not requested for the first and second low 80 MHz, feedback is requested only for the highest frequency 40 MHz (484 RU or two 242 RU) at the second highest 80 MHz, feedback is requested for the entire 80 MHz (996 RU) at the highest 80 MHz)

Ex3) B0~B8: 0 1000 0000: 996 (Feedback is not requested at the first and second high 80 MHz, also feedback is not requested by B5~B8 0000 in the second lowest 80 MHz, the full 80 MHz (996 RU) feedback is requested) at the lowest 80 MHz)

Ex4) B0~B8: 1 0100 1111: 996 (Feedback is not requested for the first, second highest 80 MHz and lowest 80 MHz, feedback is requested for the entire 80 MHz (996 RU) by B5~B8 1111) at the second lowest 80 MHz)

Ex5) B0~B8: 1 0010 0111: 484+242 (Feedback is not requested at the first, second lowest 80 MHz and highest 80 MHz, feedback is requested only for the high frequency 60 MHz (484+242 MRU or three 242 RU) by B5~B8) at the second highest 80 MHz.

Ex6) B0~B8: 1 0001 1100: 484 (Feedback is not requested at the first, second and third low 80 MHz, feedback is requested only for the low frequency 40 MHz (484 RU or two 242 RU) by B5~B8) at the highest 80 MHz.

Ex7) B0~B8: 1 1000 0100: 242 (Feedback is not requested at the first, second and third highest 80 MHz, feedback is requested only for 20 MHz (242 RU) of the second lowest frequency by B5~B8) at the lowest 80 MHz.

The order of B0 to B8 may be different.

In the partial BW feedback info field proposed in proposal 1, feedback is possible regardless of the size or location of all OFDMA MRUs and RUs of 242 RU or more currently defined within 20 MHz to 320 MHz. In addition, feedback such as 3×996+242/3×996+484+242/2×996+242/2×996+484+242 MRU in 320 MHz transmission and 996+242 MRU in 320/160 MHz transmission can be additionally requested regardless of the location of RUs. However, there is a disadvantage that it is impossible to indicate with a bitmap when feedback is requested for only some channels in several 80 MHz channels.

Suggestion 2

It is assumed that the partial BW info field consists of 9 bits of B0 to B8.

B0 is used to indicate a specific 80 MHz channel and is defined in more detail below.

B1 to B4 indicate feedback for some or all RUs within each 80 MHz channel and are defined in more detail below. Each of B1~B4 may correspond to primary 80 MHz, secondary MHz, 80 MHz corresponding to primary 80 (or lower 80 MHz) among secondary 160 MHz, and 80 MHz corresponding to secondary 80 (or higher 80 MHz) among secondary 160 MHz, or correspond to a lowest 80 MHz channel to a highest 80 MHz channel.

B5 to B8 indicate feedback for each 20 MHz (242 RU) in a specific 80 MHz channel, and 1 in B5 to B8 may mean that feedback is requested and 0 may means that feedback is not requested. In this case, each of B5 to B8 may sequentially correspond to a low 20 MHz channel to a high 20 MHz channel. Alternatively, feedback for 40 MHz (484 RU or two 242 RUs) may be indicated in two specific 80 MHz channels, and 1 may mean that feedback is requested and may mean that feedback is not requested. In this case, each of B5 to B8 may sequentially correspond to a low 40 MHz channel to a high 40 MHz channel. It is defined in more detail below.

1) When B1~B4 are all 1

B0: It has no special meaning and can be set to any value among 0 or 1 or Reserved.

B1~B4: 1 means a full 80 MHz (996RU) feedback request.

B5~B8: It has no special meaning and can be set to any value among 0 or 1 or reserved.

Ex) 0 1111 0000: 4×996 (all 320 MHz feedback requests)

2) When only two of B1~B4 values are 0

B0: 0 indicates an 80 MHz channel corresponding to a value of 0 among B1 to B4, and 1 indicates an 80 MHz channel corresponding to a value of 1 among B1 to B4. Also, the value of B0 may indicate the opposite case.

B1~B4: When B0 is 0, 1 in B1~B4 means feedback request for the entire 80 MHz (996 RU), and 0 in B1~B4 means 40 MHz channel (484 RU or two 242 RU) of some of the channels) means a request for feedback. If B0 is 1, 0 of B1 to B4 means that feedback of the entire 80 MHz channel (996 RU) is not requested, and 1 of B1 to B4 means a feedback request for a 40 MHz channel (484 RU or two 242 RUs) of some of the 80 MHz channels.

B5~B8: Indicates feedback for each 40 MHz (484 RU or two 242 RU) at the two channels indicated by B0.

Ex1) B0~B8: 0 1100 1101: 3×996+484 (the entire 80 MHz (996 RU) feedback is requested at the second highest 80 MHz, and feedback is requested only for the lowest frequency 40 MHz (484 RU or two 242 RU) at the highest 80 MHz)

Ex2) B0~B8: 0 1001 0011: (feedback is not requested at the second lowest 80 MHz, and the full 80 MHz (996 RU) feedback is requested at the second highest 80 MHz)

Ex3) B0~B8: 0 1100 1000: 2×996+484 (Feedback is not requested at the highest and only the lowest frequency 40 MHz (484 RU or two 242 RU) feedback is requested at the second highest 80 MHz)

Ex4) B0~B8: 0 0011 0000: 2×996 (feedback is not requested in the first and second lowest 80 MHz)

Ex5) B0~B8: 1 1100 1111: 2×996 (Feedback is not requested in the first and second highest 80 MHz)

Ex6) B0~B8: 1 1100 1101: 996+484 (the entire 80 MHz (996 RU) feedback is requested in the first lowest 80 MHz, and only the highest frequency 40 MHz (484 RU or two 242 RU) feedback is requested in the second lowest 80 MHz)

Ex7) B0~B8: 1 1100 0011: 996 (feedback is not requested at the lowest 80 MHz, and the full 80 MHz (996 RU) feedback is requested at the second lowest 80 MHz)

Ex8) B0~B8: 1 1100 1000: 484 (Feedback is not requested at the second lowest and feedback is requested only for the lowest frequency 40 MHz (484 RU or two 242 RU) at the lowest 80 MHz.

3) When only 3 of B1~B4 values are 0

B0: 1 indicates an 80 MHz channel corresponding to a value of 1 among B1 to B4, and 0 indicates an 80 MHz channel constituting a 160 MHz channel together with an 80 MHz channel corresponding to a value of 1 among B1 to B4. Also, the value of B0 may indicate the opposite case.

B1~B4: When B0 is 0, 1 in B1~B4 means a feedback request for the entire 80 MHz (996RU), and 0 in B1~B4 means a feedback request for 242 RU of some of the 80 MHz channels (indicated by B0 80 MHz channel part) or means that feedback of the entire 80 MHz channel (996 RU) is not requested.

If B0 is 1, 1 in B1 to B4 means a feedback request for 242 RU of some of the 80 MHz channels (the 80 MHz channel portion indicated by B0), and 0 in B1 to B4 means the entire 80 MHz channel (996 RU) means that feedback is not requested.

B5~B8: Indicate each 20 MHz (242 RU) feedback in the 80 MHz channel indicated by B0.

Ex1) B0~B8: 0 1000 1110: 996+484+242 (feedback is not requested for the first and second highest 80 MHz, and only the low frequency 60 MHz (484+242 MRU or three 242 RU) feedback is requested in the second low 80 MHz, and the full 80 MHz (996 RU) feedback is requested at the lowest 80 MHz)

Ex2) B0~B8: 0 0001 0011: 996+484 (Feedback is not requested in the first and second lowest 80 MHz, feedback is requested only for the highest frequency 40 MHz (484 RU or two 242 RU) at the second highest 80 MHz, and full 80 MHz (996 RU) feedback is requested) at the highest 80 MHz)

Ex3) B0~B8: 0 1000 0000: 996 (Feedback is not requested in the first and second highest 80 MHz, feedback is also not requested by B5~B8 0000 at the second lowest 80 MHz, and the full 80 MHz (996 RU) feedback is requested at the lowest 80 MHz)

Ex4) B0~B8: 1 0100 1111: 996 (Feedback is not requested in the first and second highest 80 MHz and lowest 80 MHz, the full 80 MHz (996 RU) feedback is requested by B5~B8 1111 in the second lowest 80 MHz)

Ex5) B0~B8: 1 0010 0111: 484+242 (Feedback is not requested in the first, second lowest 80 MHz and highest 80 MHz, and feedback is requested only for the highest frequency 60 MHz (484+242 MRU or three 242 RU) by B5~B8 in the second high 80 MHz)

Ex6) B0~B8: 1 0001 1100: 484 (Feedback is not requested in the first, second and third lowest 80 MHz, and feedback is requested only for the lowest frequency 40 MHz (484 RU or two 242 RU) by B5~B8 at the highest 80 MHz)

Ex7) B0~B8: 1 1000 0100: 242 (Feedback is not requested in the first, second and third highest 80 MHz, and feedback is requested only for 20 MHz (242 RU) of the second lowest frequency by B5~B8 at the lowest 80 MHz)

The order of B0 to B8 may be different.

In the partial BW feedback info field proposed above, feedback is possible regardless of the size or location of all OFDMA MRUs and RUs of 242 RU or more currently defined within 20 MHz to 320 MHz. In addition, feedback such as 2×996+484+484 in 320 MHz transmission and 484+484 MRU in 320/160 MHz transmission can be additionally requested regardless of the location of RUs. However, there may be restrictions on transmission with holes of 242 RU units within 320 MHz. For example, there is a disadvantage in that it is impossible to request feedback such as 3×996+484+242/3×996+242/2×996+484+242/2×996+242 MRU.

Suggestion 3

It is assumed that the partial BW info field consists of 9 bits of B0 to B8. An example of replacing the case where only two values of B1 to B4 of proposal 1 are 0 is replaced with the case where only two values of B1 to B4 of proposal 2 are 0.

B0 is used to indicate a specific 80 MHz channel and is defined in more detail below.

B1 to B4 indicate feedback for some or all RUs within each 80 MHz channel and are defined in more detail below. B1~B4 may correspond to primary 80 MHz, secondary 80 MHz, MHz corresponding to primary 80 (or lower 80 MHz) among secondary 160 MHz, 80 MHz corresponding to secondary among secondary 160 MHz (or higher 80 MHz) in order, or correspond to a lowest 80 MHz channel to a highest 80 MHz channel.

B5 to B8 indicate feedback for each 20 MHz (242 RU) in a specific 80 MHz channel, and 1 in B5 to B8 may mean that feedback is requested, and 0 in B5 to B8 may mean not requested. In this case, each of B5 to B8 may sequentially correspond to a lowest 20 MHz channel and a highest 20 MHz channel. Alternatively, feedback for 40 MHz (484 RU or two 242 RU) may be indicated in two specific 80 MHz channels, and 1 in B5 to B8 may mean that feedback is requested, and 0 in B5 to B8 may mean not requested. In this case, each of B5 to B8 may sequentially correspond to a lowest 40 MHz channel and a highest 40 MHz channel. It is defined in more detail below.

1) When B1~B4 are all 1

B0: It has no special meaning and can be set to any value among 0 or 1 or Reserved.

B1~B4: 1 means a full 80 MHz (996RU) feedback request.

B5~B8: It has no special meaning and can be set to any value among 0 or 1 or reserved.

Ex) 0 1111 0000: 4×996 (all 320 MHz feedback requests)

2) When only one of B1~B4 values is 0

B0: It has no special meaning and can be set to any value among 0 or 1 or Reserved.

B1~B4: 1 means a feedback request for the entire 80 MHz (996 RU), and 0 means a feedback request for 242 RUs of a part of the 80 MHz channel.

B5~B8: Indicates each 20 MHz (242 RU) feedback in the 80 MHz channel with a value of 0 among B1~B4.

Ex1) B0~B8: 0 1110 1100: 3×996+484 (In the highest 80 MHz, only the low frequency 40 MHz (484 RU or two 242 RU) is requested for feedback)

Ex2) B0~B8: 0 1101 0000: 3×996 (Feedback is not requested at the second higher

3) When only two of B1~B4 values are 0

B0: 0 indicates an 80 MHz channel corresponding to a value of 0 among B1 to B4, and 1 indicates an 80 MHz channel corresponding to a value of 1 among B1 to B4. Also, the value of B0 may indicate the opposite case.

B1~B4: If B0 is 0, 1 in B1~B4 means feedback request for the entire 80 MHz (996 RU), 0 in B1 to B4 means a feedback request for a 40 MHz channel (484 RU or two 242 RUs) of some of the 80 MHz channels. If B0 is 1, 0 in B1 to B4 means that feedback of the entire 80 MHz channel (996 RU) is not requested, 1 in B1 to B4 means a feedback request for a 40 MHz channel (484 RU or two 242 RUs) of some of the 80 MHz channels.

B5~B8: Each 40 MHz (484 RU or two 242 RU) feedback is indicated in the two 80 MHz channels indicated by B0.

Ex1) B0~B8: 0 1100 1101: 3×996+484 (the entire 80 MHz (996 RU) feedback is requested in the second highest 80 MHz, and feedback is requested only for the lower frequency 40 MHz (484 RU or two 242 RU) at the highest 80 MHz)

Ex2) B0~B8: 0 1001 0011: 3×996 (feedback is not requested at the second lowest 80 MHz, and the full 80 MHz (996 RU) feedback is requested at the second highest 80 MHz)

Ex3) B0~B8: 0 1100 1000: 2×996+484 (feedback is not requested at the highest 80 MHz, only the lower frequency 40 MHz (484 RU or two 242 RU) feedback is requested at the second higher 80 MHz)

Ex4) B0~B8: 0 0011 0000: 2×996 (feedback is not requested in the first and second lowest 80 MHz)

Ex5) B0~B8: 1 1100 1111: 2×996 (Feedback is not requested in the first and second highest 80 MHz)

Ex6) B0~B8: 1 1100 1101: 996+484 (the entire 80 MHz (996 RU) feedback is requested in the first lowest 80 MHz, and only the highest frequency 40 MHz (484 RU or two 242 RU) feedback is requested in the second lowest 80 MHz)

Ex7) B0~B8: 1 1100 0011: 996 (Feedback is not requested for the lowest 80 MHz and the full 80 MHz (996 RU) feedback is requested at the second lowest 80 MHz)

Ex8) B0~B8: 1 1100 1000: 484 (Feedback is not requested at the second lowest 80 MHz and feedback is requested only for the lower frequency 40 MHz (484 RU or two 242 RU) at the lowest 80 MHz)

4) When only 3 of B1~B4 values are 0

B0: 1 indicates an 80 MHz channel corresponding to a value of 1 among B1 to B4, and 0 indicates an 80 MHz channel constituting a 160 MHz channel together with an 80 MHz channel corresponding to a value of 1 among B1 to B4. Also, the value of B0 may indicate the opposite case.

B1~B4: When B0 is 0, 1 in B1~B4 means feedback request for the entire 80 MHz (996RU), and 0 in B1~B4 requests feedback for 242 RU of some of the 80 MHz channels (indicated by B0 80 MHz channel part) or means that feedback of the entire 80 MHz channel (996 RU) is not requested.

If B0 is 1, 1 in B1 to B4 means a feedback request for 242 RU of some of the 80 MHz channels (part of the 80 MHz channel indicated by B0), 0 in B1 to B4 means that feedback of the entire 80 MHz channel (996 RU) is not requested.

B5~B8: Indicate each 20 MHz (242 RU) feedback in the 80 MHz channel indicated by B0.

Ex1) B0~B8: 0 1000 1110: 996+484+242 (Feedback is not requested in the first and second highest 80 MHz, only the low frequency 60 MHz (484+242 MRU or three 242 RU) feedback is requested in the second lowest 80 MHz, and the full 80 MHz (996 RU) feedback is requested at the lowest 80 MHz)

Ex2) B0~B8: 0 0001 0011: 996+484 (Feedback is not requested in the first and second lowest 80 MHz, feedback is requested only for the higher frequency 40 MHz (484 RU or two 242 RU) at the second highest 80 MHz, and the entire 80 MHz (996 RU) feedback is requested at the highest 80 MHz)

Ex3) B0~B8: 0 1000 0000: 996 (Feedback is not requested in the first and second highest 80 MHz, feedback is also not requested by B5~B8 0000 at the second lowest 80 MHz, and the full 80 MHz (996 RU) feedback is requested at the lowest 80 MHz)

Ex4) B0~B8: 1 0100 1111: 996 (Feedback is not requested in the first and second highest 80 MHz and lowest 80 MHz, and the full 80 MHz (996 RU) feedback is requested by B5~B8 1111 in the second lowest 80 MHz)

Ex5) B0~B8: 1 0010 0111: 484+242 (Feedback is not requested in the first, second lowest 80 MHz and highest 80 MHz, and feedback is requested only for the high frequency 60 MHz (484+242 MRU or three 242 RU) by B5~B8 in the second high 80 MHz)

Ex6) B0~B8: 1 0001 1100: 484 (Feedback is not requested in the first, second, and third lowest 80 MHz, and feedback is requested only for the low frequency 40 MHz (484 RU or two 242 RU) by B5~B8 at the highest 80 MHz)

Ex7) B0~B8: 1 1000 0100: 242 (Feedback is not requested in the first, second, and third highest 80 MHz, and feedback is requested only for 20 MHz (242 RU) of the second lowest frequency by B5~B8 at the lowest 80 MHz)

The order of B0 to B8 may be different.

In the partial BW feedback info field proposed above, feedback is possible regardless of the size or location of all OFDMA MRUs and RUs of 242 RU or more currently defined within 20 MHz to 320 MHz. In addition, feedback such as 3×996+242/3×996+484+242 MRU in 320 MHz transmission and 996+242 MRU in 320/160 MHz transmission can be additionally requested regardless of the location of RUs. In addition, feedback such as 2×996+484+484 in 320 MHz transmission and 484+484 MRU in 320/160 MHz transmission can be additionally requested regardless of the location of RUs. However, there may be restrictions on transmission with holes of 242 RU units within 320 MHz. For example, there is a disadvantage that feedback requests such as 2×996+242/2×996+484+242 MRU are not possible. Therefore, to compensate for this, an MRU/RU combination overlapping with another case among specific combinations when only two of B1 to B4 values are 0 may mean requesting feedback of another specific MRU/RU combination. For example, when only two of the B1 to B4 values are 0, the remaining combinations except for 2×996+484/484+484 MRUs are reserved and a specific combination of future extensions (e.g., 2×996+484+242/2×996+242/2×996+{484+242}+{484+242}/2×996+242+242/{484+242}+

{484+242}/242+242) can be used for feedback. { } means an RU combination within a specific 80 MHz. Alternatively, the corresponding case may be newly defined as a partial feedback indicator for a specific MRU/RU rather than a bitmap.

Alternatively, when only one of the B1 to B4 values in Proposal 3 is 0, it can be replaced with 2-1) below, and in this case, definitions such as 2×996+242/2×996+484+242 are possible. In addition, an MRU/RU combination overlapping with another case among specific combinations when only two of B1 to B4 values are 0 may mean requesting feedback of another specific MRU/RU combination. For example, when only two of the B1 to B4 values are 0, the rest of the combinations except for multi-hole combinations (2×996+484+484/484+484 MRUs) are reserved for specific combinations of future extensions (e.g., 2×996+{484+242}+{484+242}/2×996+242+242/{484+242}+{484+242}/242+242) can be used for feedback. { } means an RU combination within a specific 80 MHz. Alternatively, the corresponding case may be newly defined as a partial feedback indicator for a specific MRU/RU rather than a bitmap.

2-1) When only one of B1~B4 values is 0

B0: 0 indicates an 80 MHz channel corresponding to a value of 0 among B1 to B4, and 1 indicates an 80 MHz channel consisting of a 160 MHz channel together with an 80 MHz channel corresponding to a value of 0 among B1 to B4. Also, the value of B0 may indicate the opposite case.

B1~B4: When B0 is 0, 1 in B1~B4 means a feedback request for the entire 80 MHz (996RU), and 0 in B1~B4 means a feedback request for 242 RU of a part of the 80 MHz channel (indicated by B0 80 MHz channel part).

If B0 is 1, 1 in B1 to B4 means a feedback request for 242 RU of a part of the 80 MHz channel (the part of the 80 MHz channel indicated by B0) or a feedback request for the entire MHz (996 RU), and 0 in B1 to B4 means that feedback of the entire 80 MHz channel (996 RU) is not requested.

B5~B8: Indicate each 20 MHz (242 RU) feedback in the 80 MHz channel indicated by B0.

Ex1) B0~B8: 0 1110 1100: 3×996+484 (only the low frequency 40 MHz (484 RU or two 242 RU) requires feedback in the highest 80 MHz)

Ex2) B0~B8: 0 1101 0000: 3×996 (Feedback is not requested at the second highest by B5~B8 0000)

Ex3) B0~B8: 1 1110 1100: 2×996+484 (Feedback is not requested at the highest and only the lower frequency 40 MHz (484 RU or two 242 RU) feedback is requested at the second highest 80 MHz)

Ex4) B0~B8: 1 1101 0000: 2×996 (Feedback is not requested at the second highest and feedback is also not requested by B5~B8 0000 in the first highest 80 MHz)

Figure 21:
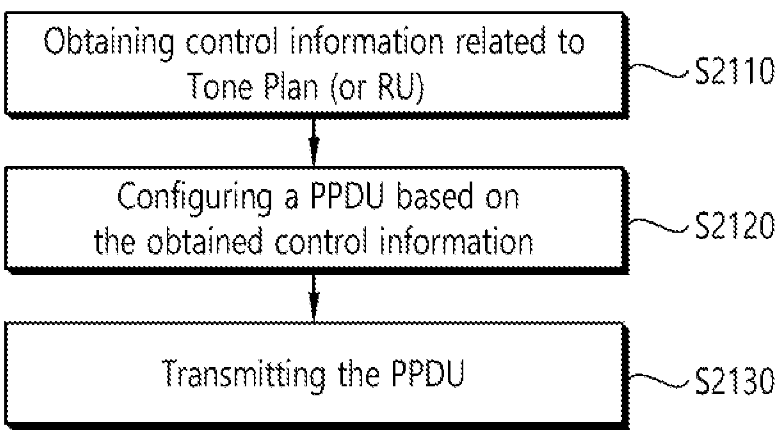
FIG. 21 is a flowchart illustrating the operation of the transmitting apparatus/device according to the present embodiment.

FIG. 21 is a flowchart illustrating the operation of the transmitting apparatus/device according to the present embodiment.

The example of FIG. 21 may be performed by a transmitting device (AP and/or non-AP STA).

Some of each step (or detailed sub-step to be described later) of the example of FIG. 21 may be skipped/omitted.

Through step S2110, the transmitting device (transmitting STA) may obtain information about the above-described tone plan. As described above, the information about the tone plan includes the size and location of the RU, control information related to the RU, information about a frequency band including the RU, information about an STA receiving the RU, and the like.

Through step S2120, the transmitting device may construct/generate a PPDU based on the acquired control information. Configuring/generating the PPDU may include configuring/generating each field of the PPDU. That is, step S2120 includes configuring the EHT-SIG field including control information about the tone plan. That is, step S2120 includes configuring a field including control information (e.g., N bitmap) indicating the size/position of the RU; and/or configuring a field including an identifier of an STA receiving the RU (e.g., AID).

Also, step S2120 may include generating an STF/LTF sequence transmitted through a specific RU. The STF/LTF sequence may be generated based on a preset STF generation sequence/LTF generation sequence.

Also, step S2120 may include generating a data field (i.e., MPDU) transmitted through a specific RU.

The transmitting device may transmit the PPDU constructed through step S1720 to the receiving device based on step S2130.

While performing step S2130, the transmitting device may perform at least one of operations such as CSD, Spatial Mapping, IDFT/IFFT operation, and GI insertion.

A signal/field/sequence constructed according to the present specification may be transmitted in the form of FIG. 10.

Figure 22:
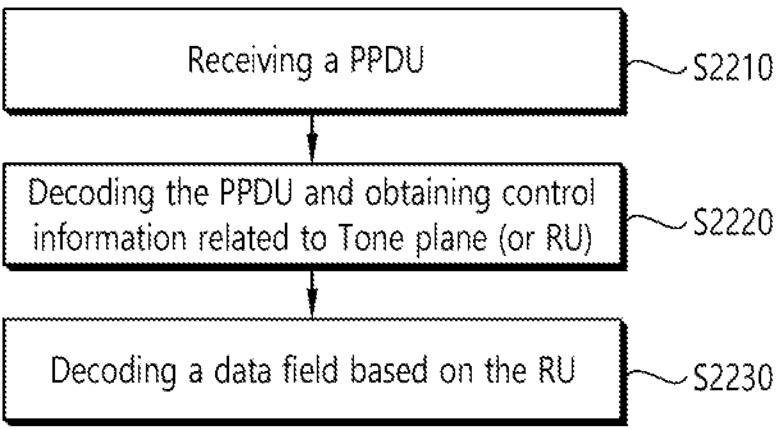
FIG. 22 is a flowchart illustrating the operation of the receiving apparatus/device according to the present embodiment.

FIG. 22 is a flowchart illustrating the operation of the receiving apparatus/device according to the present embodiment.

The aforementioned PPDU may be received according to the example of FIG. 22.

The example of FIG. 22 may be performed by a receiving apparatus/device (AP and/or non-AP STA).

Some of each step (or detailed sub-step to be described later) of the example of FIG. 22 may be skipped/omitted.

The receiving device (receiving STA) may receive all or part of the PPDU through step S2210. The received signal may be in the form of FIG. 10.

A sub-step of step S2210 may be determined based on step S2130 of FIG. 21. That is, in step S2210, an operation of restoring the result of the CSD, Spatial Mapping, IDFT/IFFT operation, and GI insertion operation applied in step S2130 may be performed.

In step S2220, the receiving device may perform decoding on all/part of the PPDU. Also, the receiving device may obtain control information related to a tone plan (i.e., RU) from the decoded PPDU.

More specifically, the receiving device may decode the L-SIG and EHT-SIG of the PPDU based on the legacy STF/LTF and obtain information included in the L-SIG and EHT SIG fields. Information on various tone plans (i.e., RUs) described in this specification may be included in the EHT-SIG, and the receiving STA may obtain information on the tone plan (i.e., RU) through the EHT-SIG.

In step S2230, the receiving device may decode the remaining part of the PPDU based on information about the tone plan (i.e., RU) acquired through step S2220. For example, the receiving STA may decode the STF/LTF field of the PPDU based on information about one plan (i.e., RU). In addition, the receiving STA may decode the data field of the PPDU based on information about the tone plan (i.e., RU) and obtain the MPDU included in the data field.

In addition, the receiving device may perform a processing operation of transferring the data decoded through step S2230 to a higher layer (e.g., MAC layer). In addition, when generation of a signal is instructed from the upper layer to the PHY layer in response to data transmitted to the upper layer, a subsequent operation may be performed.

Hereinafter, the above-described embodiment will be described with reference to FIG. 1 to FIG. 22.

Figure 23:
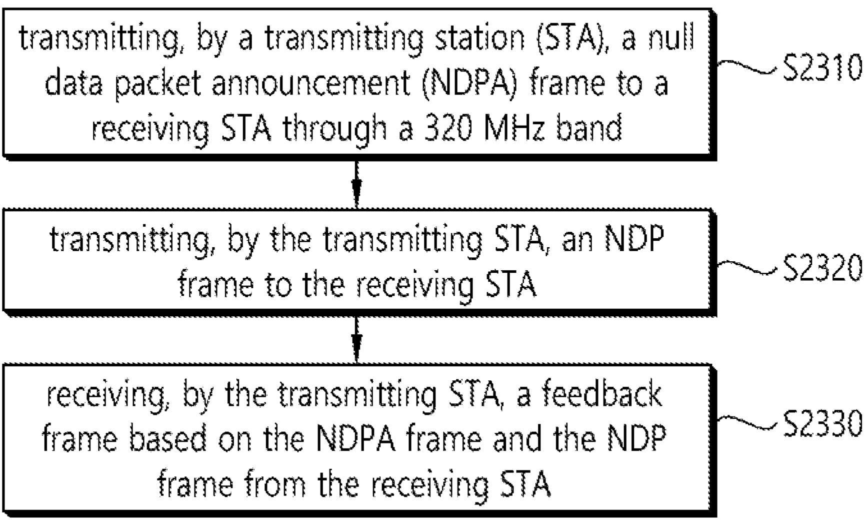
FIG. 23 is a flow diagram illustrating a procedure for receiving a feedback frame by a transmitting STA according to the present embodiment.

FIG. 23 is a flow diagram illustrating a procedure for receiving a feedback frame by a transmitting STA according to the present embodiment.

The example of FIG. 23 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 23 is performed in a transmitting STA, and the transmitting STA may correspond to a beamformer or an access point (AP). The receiving STA of FIG. 23 may correspond to a beamformee or at least one STA (station).

This embodiment proposes a method of configuring an information field for partial bands of an NDPA frame for channel sounding feedback in puncturing in a 320 MHz band or various RUs/MRUs.

In step S2310, a receiving STA (station) receives a Null Data Packet Announcement (NDPA) frame from a transmitting STA through a 320 MHz band.

In step S2320, the receiving STA receives an NDP frame from the transmitting STA.

In step S2330, the receiving STA transmits a feedback frame to the transmitting STA based on the NDPA frame and the NDP frame.

The NDPA frame includes information on a partial band. The information on the partial band includes a bitmap composed of first to ninth bits.

The first bit is a bit requesting feedback information for a specific 80 MHz channel of the 320 MHz band.

The second bit is a bit requesting feedback information for an 80 MHz channel having the lowest frequency in the 320 MHz band. The third bit is a bit requesting feedback information for an 80 MHz channel having a second lowest frequency in the 320 MHz band. The fourth bit is a bit requesting feedback information for an 80 MHz channel having the second highest frequency in the 320 MHz band. The fifth bit is a bit requesting feedback information for an 80 MHz channel having the highest frequency in the 320 MHz band.

The sixth to ninth bits are bits requesting feedback information on a 242-tone resource unit (RU) or a 484-tone RU in the specific 80 MHz channel.

The feedback frame may include feedback information for the requested channel based on the bitmap. The feedback information may include channel state information for an RU or a multi resource unit (MRU) for which feedback is requested based on the bitmap.

A bitmap for requesting feedback information on the partial band (RU or MRU) may be configured as follows.

As an example, a bitmap configuration when the second to fifth bits are all set to 1 is as follows.

The first and sixth to ninth bits may be set to 0 or 1 or reserved, and the second to fifth bits may request feedback information for a 4×996-tone RU. That is, the second bit may request feedback information on an 80 MHz channel having the lowest frequency, the third bit may request feedback information on an 80 MHz channel having the second lowest frequency, and the fourth bit may request feedback information on an 80 MHz channel having the second highest frequency, since the fifth bit requests feedback information for an 80 MHz channel having the highest frequency, the second to fifth bits, all set to 1, may request feedback information for the 4×996-tone RU.

As another example, a bitmap configuration when only one of the second to fifth bits is set to 0 is as follows.

When the first bit is set to 0, the first bit may indicate a first 80 MHz channel, a bit set to 0 among the second to fifth bits may request feedback information for a 242-tone RU in the first 80 MHz channel, the sixth to ninth bits may indicate a location of the 242-tone RU in the first 80 MHz channel, a bit set to 1 among the second to fifth bits may request feedback information for the remaining 80 MHz channels except for the first 80 MHz channel in the 320 MHz band. For example, when the bitmap is set to 011101100, the second to fourth bits request feedback information for a corresponding 80 MHz channel, respectively. Since the fifth bit requests feedback information on two 242-tone RUs (i.e., 484-tone RU) having a low frequency in the corresponding 80 MHz channel based on the sixth to ninth bits, it can be seen that the bitmap 011101100 requests feedback information for a 3×996+484 tone RU.

When the first bit is set to 1, the first bit may indicate a second 80 MHz channel consisting of a 160 MHz channel together with a first 80 MHz channel, a bit set to 0 among the second to fifth bits may indicate that feedback information for the first 80 MHz channel is not requested, the bit set to 1 among the second to fifth bits may request feedback information on the remaining 80 MHz channels except for the first and second 80 MHz channels in the 320 MHz band and feedback information for a 242-tone RU in the second 80 MHz channel, the sixth to ninth bits may indicate a location of the 242-tone RU in the second 80 MHz channel. For example, when the bitmap is set to 111101100, the second and third bits may request feedback information for a corresponding 80 MHz channel, respectively, the fourth bit may request feedback information on two 242-tone RUs (i.e., 484-tone RU) having a low frequency in the corresponding 80 MHz channel based on the sixth to ninth bits. Since the fifth bit does not request feedback information for the corresponding 80 MHz channel, it can be seen that the bitmap 111101100 requests feedback information for a 2×996+484 tone RU.

As another example, a bitmap configuration when only two of the second to fifth bits are set to 0 is as follows.

when the first bit is set to 0, the first bit may indicate first and second 80 MHz channels, a first bit of the two bits set to 0 among the second to fifth bits may request feedback information on a 484-tone RU or two 242-tone RUs in the first 80 MHz channel, the sixth and seventh bits may indicate a location of the 484-tone RU or the two 242-tone RUs in the first MHz channel, a second bit of the two bits set to 0 among the second to fifth bits may request feedback information for a 484-tone RU or two 242-tone RUs in the second 80 MHz channel, the eighth and ninth bits may indicate a location of the 484-tone RU or the two 242-tone RUs in the second 80 MHz channel, and a bit set to 1 among the second to fifth bits may request feedback information on the remaining 80 MHz channels except for the first and second 80 MHz channels in the 320 MHz band. For example, when the bitmap is set to 011001101, the second and third bits may request feedback information for a corresponding 80 MHz channel, respectively. The fourth bit may request feedback information on a 484-tone RU or two 242-tone RUs in a corresponding 80 MHz channel based on the sixth and seventh bits. Since the fifth bit requests feedback information on a 484-tone RU or two 242-tone RUs in a corresponding 80 MHz channel based on the eighth and ninth bits, it can be seen that the bitmap 011001101 requests feedback information for a 3×996+484 tone RU.

When the first bit is set to 1, the first bit may indicate third and fourth 80 MHz channels, a first bit of the two bits set to 1 among the second to fifth bits may request feedback information for a 484-tone RU or two 242-tone RUs in the third 80 MHz channel, the sixth and seventh bits may indicate a location of the 484-tone RU or the two 242-tone RUs in the third MHz channel, a second bit of the two bits set to 1 among the second to fifth bits may request feedback information for a 484-tone RU or two 242-tone RUs in the fourth 80 MHz channel, the sixth and seventh bits may indicate a location of the 484-tone RU or the two 242-tone RUs in the fourth 80 MHz channel, and a bit set to 0 among the second to fifth bits may indicate that feedback information for the remaining 80 MHz channels other than the third and fourth MHz channels in the 320 MHz band is not requested. For example, when the bitmap is set to 111001111, the second bit requests feedback information for a 484-tone RU or two 242-tone RUs in a corresponding 80 MHz channel based on the sixth and seventh bits, the third bit requests feedback information on a 484-tone RU or two 242-tone RUs in a corresponding 80 MHz channel based on the eighth and ninth bits. Since the fourth and fifth bits do not request feedback information for the corresponding 80 MHz channel, respectively, it can be seen that the bitmap 111001111 requests feedback information for a 2×996 tone RU.

As another example, a bitmap configuration when only three of the second to fifth bits are set to 0 is as follows.

When the first bit is set to 0, the first bit may indicate a second 80 MHz channel consisting of a 160 MHz channel together with a first 80 MHz channel, a bit set to 0 among the second to fifth bits may request feedback information on a 242-tone RU in the second 80-MHz channel and may indicate that feedback information for the remaining 80 MHz channels other than the first and second 80 MHz channels is not requested in the 320 MHz band, the sixth to ninth bits may indicate a location of the 242-tone RU in the second 80 MHz channel, and a bit set to 1 among the second to fifth bits may request feedback information for the first 80 MHz channel. For example, when the bitmap is set to 010001110, the second bit may request feedback information for a corresponding 80 MHz channel, the third bit may request feedback information for a 242-tone RU in a corresponding 80 MHz channel based on the sixth to ninth bits. Since the fourth and fifth bits do not request feedback information for the corresponding MHz channel, respectively, it can be seen that the bitmap 010001110 requests feedback information for a 996+484+242 tone RU.

When the first bit is set to 1, the first bit may indicate a first 80 MHz channel, a bit set to 1 among the second to fifth bits may request feedback information for a 242-tone RU in the first 80 MHz channel, the sixth to ninth bits may indicate a location of the 242-tone RU in the first 80 MHz channel, and a bit set to 0 among the second to fifth bits may indicate that feedback information for the remaining 80 MHz channels other than the first 80 MHz channel in the 320 MHz band is not requested. For example, when the bitmap is set to 101001111, the second, fourth, and fifth bits do not request feedback information for a corresponding 80 MHz channel, respectively. Since the third bit requests feedback information for a 242-tone RU in a corresponding 80 MHz channel based on the sixth to ninth bits, it can be seen that the bitmap 101001111 requests feedback information for a 996-tone RU.

In the present specification, more various embodiments and examples according to the configuration of the above-described bitmap have been described above.

The 242-tone RU may be a resource unit composed of 242 tones, the 484 tone RU may be a resource unit composed of 484 tones, and the 996-ton RU may be a resource unit composed of 996 tones. Also, 242+484-tone RU may correspond to an MRU in which 242-tone RU and 484-tone RU are aggregated.

The NDP frame may be transmitted in the same band as the NDPA frame (the 320 MHz band). Partial bands for which feedback is requested through the bitmap may be punctured within the 320 MHz band or may be composed of various RUs or MRUs. The NDP frame may be defined as a variant of an Extremely High Throughput (EHT) Multi User (MU) PPDU. The NDP frame may include a Legacy-Short Training Field (L-STF), a Legacy-Long Training Field (L-LTF), a Legacy-Signal (L-SIG), Repeated L-SIG (RL-SIG), an Universal-Signal (U-SIG), an EHT-SIG, an EHT-STF, EHT-LTFs and a packet extension (PE) without data.

Figure 24:
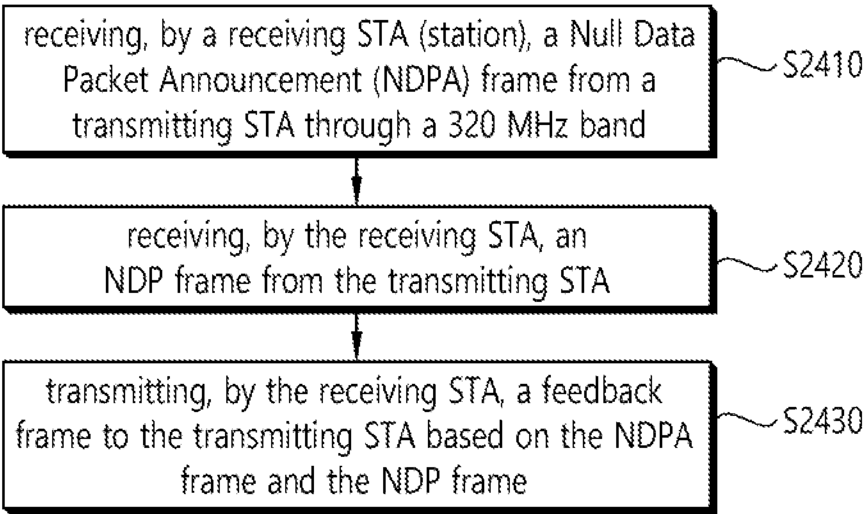
FIG. 24 is a flow diagram illustrating a procedure for transmitting a feedback frame by a receiving STA according to the present embodiment.

FIG. 24 is a flow diagram illustrating a procedure for transmitting a feedback frame by a receiving STA according to the present embodiment.

The example of FIG. 24 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 24 is performed in a receiving STA, and the transmitting STA may correspond to a beamformee or at least one STA (station). The transmitting STA of FIG. 24 may correspond to a beamformer or an access point (AP).

This embodiment proposes a method of configuring an information field for partial bands of an NDPA frame for channel sounding feedback in puncturing in a 320 MHz band or various RUs/MRUs.

In step S2410, a transmitting STA (station) transmits a Null Data Packet Announcement (NDPA) frame to the receiving STA through a 320 MHz band.

In step S2420, the transmitting STA transmits an NDP frame to the receiving STA.

In step S2430, the transmitting STA receives a feedback frame based on the NDPA frame and the NDP frame from the receiving STA.

The NDPA frame includes information on a partial band. The information on the partial band includes a bitmap composed of first to ninth bits.

The first bit is a bit requesting feedback information for a specific 80 MHz channel of the 320 MHz band.

The second bit is a bit requesting feedback information for an 80 MHz channel having the lowest frequency in the 320 MHz band. The third bit is a bit requesting feedback information for an 80 MHz channel having a second lowest frequency in the 320 MHz band. The fourth bit is a bit requesting feedback information for an 80 MHz channel having the second highest frequency in the 320 MHz band. The fifth bit is a bit requesting feedback information for an 80 MHz channel having the highest frequency in the 320 MHz band.

The sixth to ninth bits are bits requesting feedback information on a 242-tone resource unit (RU) or a 484-tone RU in the specific 80 MHz channel.

The feedback frame may include feedback information for the requested channel based on the bitmap. The feedback information may include channel state information for an RU or a multi resource unit (MRU) for which feedback is requested based on the bitmap.

A bitmap for requesting feedback information on the partial band (RU or MRU) may be configured as follows.

As an example, a bitmap configuration when the second to fifth bits are all set to 1 is as follows.

The first and sixth to ninth bits may be set to 0 or 1 or reserved, and the second to fifth bits may request feedback information for a 4×996-tone RU. That is, the second bit may request feedback information on an 80 MHz channel having the lowest frequency, the third bit may request feedback information on an 80 MHz channel having the second lowest frequency, and the fourth bit may request feedback information on an 80 MHz channel having the second highest frequency, since the fifth bit requests feedback information for an 80 MHz channel having the highest frequency, the second to fifth bits, all set to 1, may request feedback information for the 4×996-tone RU.

As another example, a bitmap configuration when only one of the second to fifth bits is set to 0 is as follows.

When the first bit is set to 0, the first bit may indicate a first 80 MHz channel, a bit set to 0 among the second to fifth bits may request feedback information for a 242-tone RU in the first 80 MHz channel, the sixth to ninth bits may indicate a location of the 242-tone RU in the first 80 MHz channel, a bit set to 1 among the second to fifth bits may request feedback information for the remaining 80 MHz channels except for the first 80 MHz channel in the 320 MHz band. For example, when the bitmap is set to 011101100, the second to fourth bits request feedback information for a corresponding 80 MHz channel, respectively. Since the fifth bit requests feedback information on two 242-tone RUs (i.e., 484-tone RU) having a low frequency in the corresponding 80 MHz channel based on the sixth to ninth bits, it can be seen that the bitmap 011101100 requests feedback information for a 3×996+484 tone RU.

When the first bit is set to 1, the first bit may indicate a second 80 MHz channel consisting of a 160 MHz channel together with a first 80 MHz channel, a bit set to 0 among the second to fifth bits may indicate that feedback information for the first 80 MHz channel is not requested, the bit set to 1 among the second to fifth bits may request feedback information on the remaining 80 MHz channels except for the first and second 80 MHz channels in the 320 MHz band and feedback information for a 242-tone RU in the second 80 MHz channel, the sixth to ninth bits may indicate a location of the 242-tone RU in the second 80 MHz channel. For example, when the bitmap is set to 111101100, the second and third bits may request feedback information for a corresponding 80 MHz channel, respectively, the fourth bit may request feedback information on two 242-tone RUs (i.e., 484-tone RU) having a low frequency in the corresponding 80 MHz channel based on the sixth to ninth bits. Since the fifth bit does not request feedback information for the corresponding 80 MHz channel, it can be seen that the bitmap 111101100 requests feedback information for a 2×996+484 tone RU.

As another example, a bitmap configuration when only two of the second to fifth bits are set to 0 is as follows.

when the first bit is set to 0, the first bit may indicate first and second 80 MHz channels, a first bit of the two bits set to 0 among the second to fifth bits may request feedback information on a 484-tone RU or two 242-tone RUs in the first 80 MHz channel, the sixth and seventh bits may indicate a location of the 484-tone RU or the two 242-tone RUs in the first MHz channel, a second bit of the two bits set to 0 among the second to fifth bits may request feedback information for a 484-tone RU or two 242-tone RUs in the second 80 MHz channel, the eighth and ninth bits may indicate a location of the 484-tone RU or the two 242-tone RUs in the second 80 MHz channel, and a bit set to 1 among the second to fifth bits may request feedback information on the remaining 80 MHz channels except for the first and second 80 MHz channels in the 320 MHz band. For example, when the bitmap is set to 011001101, the second and third bits may request feedback information for a corresponding 80 MHz channel, respectively. The fourth bit may request feedback information on a 484-tone RU or two 242-tone RUs in a corresponding 80 MHz channel based on the sixth and seventh bits. Since the fifth bit requests feedback information on a 484-tone RU or two 242-tone RUs in a corresponding 80 MHz channel based on the eighth and ninth bits, it can be seen that the bitmap 011001101 requests feedback information for a 3×996+484 tone RU.

When the first bit is set to 1, the first bit may indicate third and fourth 80 MHz channels, a first bit of the two bits set to 1 among the second to fifth bits may request feedback information for a 484-tone RU or two 242-tone RUs in the third 80 MHz channel, the sixth and seventh bits may indicate a location of the 484-tone RU or the two 242-tone RUs in the third MHz channel, a second bit of the two bits set to 1 among the second to fifth bits may request feedback information for a 484-tone RU or two 242-tone RUs in the fourth 80 MHz channel, the sixth and seventh bits may indicate a location of the 484-tone RU or the two 242-tone RUs in the fourth 80 MHz channel, and a bit set to 0 among the second to fifth bits may indicate that feedback information for the remaining 80 MHz channels other than the third and fourth MHz channels in the 320 MHz band is not requested. For example, when the bitmap is set to 111001111, the second bit requests feedback information for a 484-tone RU or two 242-tone RUs in a corresponding 80 MHz channel based on the sixth and seventh bits, the third bit requests feedback information on a 484-tone RU or two 242-tone RUs in a corresponding 80 MHz channel based on the eighth and ninth bits. Since the fourth and fifth bits do not request feedback information for the corresponding 80 MHz channel, respectively, it can be seen that the bitmap 111001111 requests feedback information for a 2×996 tone RU.

As another example, a bitmap configuration when only three of the second to fifth bits are set to 0 is as follows.

When the first bit is set to 0, the first bit may indicate a second 80 MHz channel consisting of a 160 MHz channel together with a first 80 MHz channel, a bit set to 0 among the second to fifth bits may request feedback information on a 242-tone RU in the second 80-MHz channel and may indicate that feedback information for the remaining 80 MHz channels other than the first and second 80 MHz channels is not requested in the 320 MHz band, the sixth to ninth bits may indicate a location of the 242-tone RU in the second 80 MHz channel, and a bit set to 1 among the second to fifth bits may request feedback information for the first 80 MHz channel. For example, when the bitmap is set to 010001110, the second bit may request feedback information for a corresponding 80 MHz channel, the third bit may request feedback information for a 242-tone RU in a corresponding 80 MHz channel based on the sixth to ninth bits. Since the fourth and fifth bits do not request feedback information for the corresponding MHz channel, respectively, it can be seen that the bitmap 010001110 requests feedback information for a 996+484+242 tone RU.

When the first bit is set to 1, the first bit may indicate a first 80 MHz channel, a bit set to 1 among the second to fifth bits may request feedback information for a 242-tone RU in the first 80 MHz channel, the sixth to ninth bits may indicate a location of the 242-tone RU in the first 80 MHz channel, and a bit set to 0 among the second to fifth bits may indicate that feedback information for the remaining 80 MHz channels other than the first 80 MHz channel in the 320 MHz band is not requested. For example, when the bitmap is set to 101001111, the second, fourth, and fifth bits do not request feedback information for a corresponding 80 MHz channel, respectively. Since the third bit requests feedback information for a 242-tone RU in a corresponding 80 MHz channel based on the sixth to ninth bits, it can be seen that the bitmap 101001111 requests feedback information for a 996-tone RU.

In the present specification, more various embodiments and examples according to the configuration of the above-described bitmap have been described above.

The 242-tone RU may be a resource unit composed of 242 tones, the 484 tone RU may be a resource unit composed of 484 tones, and the 996-ton RU may be a resource unit composed of 996 tones. Also, 242+484-tone RU may correspond to an MRU in which 242-tone RU and 484-tone RU are aggregated.

The NDP frame may be transmitted in the same band as the NDPA frame (the 320 MHz band). Partial bands for which feedback is requested through the bitmap may be punctured within the 320 MHz band or may be composed of various RUs or MRUs. The NDP frame may be defined as a variant of an Extremely High Throughput (EHT) Multi User (MU) PPDU. The NDP frame may include a Legacy-Short Training Field (L-STF), a Legacy-Long Training Field (L-LTF), a Legacy-Signal (L-SIG), Repeated L-SIG (RL-SIG), an Universal-Signal (U-SIG), an EHT-SIG, an EHT-STF, EHT-LTFs and a packet extension (PE) without data.

3. Device Configuration

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure receives a Null Data Packet Announcement (NDPA) frame from a transmitting station (STA) through a 320 MHz band; receives an NDP frame from the transmitting STA; and transmits a feedback frame to the transmitting STA based on the NDPA frame and the NDP frame.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving a Null Data Packet Announcement (NDPA) frame from a transmitting station (STA) through a 320 MHz band; receiving an NDP frame from the transmitting STA; and transmitting a feedback frame to the transmitting STA based on the NDPA frame and the NDP frame. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method performed by a station (STA) and comprising:

receiving a Null Data Packet Announcement (NDPA) frame, wherein the NDPA frame includes partial bandwidth information including a one-bit subfield and a bitmap subfield having a length of 8 bits, wherein the partial bandwidth information has a length of 9 bits, and wherein based on a bandwidth of a physical protocol data unit (PPDU) carrying the NDPA frame being 320 MHz and the one-bit subfield having a value of 1, at least four bits of the bitmap subfield respectively indicate, in an order:

a feedback request on a 996-tone resource unit (RU) in a lowest 80 MHz of the 320 MHz;

a feedback request on a 996-tone RU in a second lowest 80 MHz of the 320 MHz;

a feedback request on a 996-tone RU in a third lowest 80 MHz of the 320 MHz; and a feedback request on a 996-tone RU in a highest 80 MHz of the 320 MHz;

receiving a Null Data Packet (NDP) frame; and transmitting a feedback frame, wherein the feedback frame includes beamforming information for subcarrier indices requested by the partial bandwidth information, wherein the lowest 80 MHz to the highest 80 MHz respectively include two 484-tone RUs, and wherein a feedback tone set for each of the two 484-tone RUs is composed of feedback tone sets of two 242-tone RUs overlapping with one 484-tone RU.

2. The method of claim 1, wherein the partial bandwidth information is included in a STA information field in the NDPA frame, and wherein the STA information field has a length of 32 bits.

3. The method of claim 2, wherein the STA information field includes Association Identifier 11 (AID11) subfield, and wherein the AID11 subfield includes an identifier of a STA expected to process a following EHT sounding NDP.

4. The method of claim 1, wherein the NDPA frame is an Extremely High Throughput (EHT) NDPA frame.

5. The method of claim 1, wherein the feedback frame is an Extremely High Throughput (EHT) Compressed Beamforming or Channel Quality Indicator (CQI) frame.

6. The method of claim 1, wherein the feedback frame includes feedback information on a requested channel based on the partial bandwidth information, wherein the feedback information includes channel state information for an RU or a multi resource unit (MRU) for which feedback is requested based on the partial bandwidth information, wherein each of the 242-tone RUs is a resource unit composed of 242 tones, wherein each of the 484-tone RUs is a resource unit composed of 484 tones.

7. A station (STA) in a wireless local area network (WLAN) system, the STA comprising:

a memory;

a transceiver; and a processor being operatively connected to the memory and the transceiver, wherein the processor is configured to:

receive a Null Data Packet Announcement (NDPA) frame;

wherein the NDPA frame includes partial bandwidth information including a one-bit subfield and a bitmap subfield having a length of 8 bits, wherein the partial bandwidth information has a length of 9 bits, and wherein based on a bandwidth of a physical protocol data unit (PPDU) carrying the NDPA frame being 320 MHz and the one-bit subfield having a value of 1, at least four bits of the bitmap subfield respectively indicate, in an order:

a feedback request on a 996-tone resource unit (RU) in a lowest 80 MHz of the 320 MHz;

a feedback request on a 996-tone RU in a second lowest 80 MHz of the 320 MHz;

a feedback request on a 996-tone RU in a third lowest 80 MHz of the 320 MHz; and a feedback request on a 996-tone RU in a highest 80 MHz of the 320 MHz;

receiving a Null Data Packet (NDP) frame; and transmitting a feedback frame, wherein the feedback frame includes beamforming information for subcarrier indices requested by the partial bandwidth information, wherein the lowest 80 MHz to the highest 80 MHz respectively include two 484-tone RUs, and wherein a feedback tone set for each of the two 484-tone RUs is composed of feedback tone sets of two 242-tone RUs overlapping with one 484-tone RU.

8. A method in a wireless local area network (WLAN) system, the method performed by a station (STA) and comprising:

transmitting a null data packet announcement (NDPA) frame, wherein the NDPA frame includes partial bandwidth information including a one-bit subfield and a bitmap subfield having a length of 8 bits, wherein the partial bandwidth information has a length of 9 bits, and wherein based on a bandwidth of a physical protocol data unit (PPDU) carrying the NDPA frame being 320 MHz and the one-bit subfield having a value of 1, at least four bits of the bitmap subfield respectively indicate, in an order:

a feedback request on a 996-tone resource unit (RU) in a lowest 80 MHz of the 320 MHz;

a feedback request on a 996-tone RU in a second lowest 80 MHz of the 320 MHz;

a feedback request on a 996-tone RU in a third lowest 80 MHz of the 320 MHz; and a feedback request on a 996-tone RU in a highest 80 MHz of the 320 MHz;

receiving a Null Data Packet (NDP) frame; and transmitting a feedback frame, wherein the feedback frame includes beamforming information for subcarrier indices requested by the partial bandwidth information, wherein the lowest 80 MHz to the highest 80 MHz respectively include two 484-tone RUs, and wherein a feedback tone set for each of the two 484-tone RUs is composed of feedback tone sets of two 242-tone RUs overlapping with one 484-tone RU.

9. The method of claim 8, wherein the partial bandwidth information is included in a STA information field in the NDPA frame, and wherein the STA information field has a length of 32 bits.

10. The method of claim 9, wherein the STA information field includes Association Identifier 11 (AID11) subfield, and wherein the AID11 subfield includes an identifier of a STA expected to process a following EHT sounding NDP.

11. The method of claim 8, wherein the NDPA frame is an Extremely High Throughput (EHT) NDPA frame.

12. The method of claim 8, wherein the feedback frame is an Extremely High Throughput (EHT) Compressed Beamforming or Channel Quality Indicator (CQI) frame.

13. The method of claim 8, wherein the feedback frame includes feedback information on a requested channel based on the partial bandwidth information, wherein the feedback information includes channel state information for an RU or a multi resource unit (MRU) for which feedback is requested based on the partial bandwidth information, wherein each of the 242-tone RUs is a resource unit composed of 242 tones, wherein each of the 484-tone RUs is a resource unit composed of 484 tones.

* * * * *